US012449569B2

(12) United States Patent
Yamada

(10) Patent No.: US 12,449,569 B2
(45) Date of Patent: Oct. 21, 2025

(54) WAVEFRONT CONTROL ELEMENT, LIGHTING DEVICE, AND PROJECTOR

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 506 days.

(21) Appl. No.: 17/955,870

(22) Filed: Sep. 29, 2022

(65) Prior Publication Data
US 2023/0102400 A1  Mar. 30, 2023

(30) Foreign Application Priority Data

Sep. 30, 2021 (JP) ................. 2021-160802

(51) Int. Cl.
| | | |
|---|---|---|
| G02B 3/00 | (2006.01) | |
| G02B 1/00 | (2006.01) | |
| G02B 3/02 | (2006.01) | |
| G02B 5/18 | (2006.01) | |
| G03B 21/14 | (2006.01) | |

(52) U.S. Cl.
CPC ............ *G02B 3/0037* (2013.01); *G02B 1/002* (2013.01); *G02B 3/02* (2013.01); *G02B 5/18* (2013.01); *G03B 21/14* (2013.01)

(58) Field of Classification Search
None
See application file for complete search history.

(56) References Cited

U.S. PATENT DOCUMENTS

| | | | |
|---|---|---|---|
| 9,159,761 B2 | 10/2015 | Kokubun | |
| 11,206,978 B2 * | 12/2021 | Hu | A61B 3/12 |
| 2015/0115383 A1 | 4/2015 | Kokubun | |
| 2017/0082263 A1 * | 3/2017 | Byrnes | G02B 1/005 |
| 2019/0137075 A1 | 5/2019 | Aieta et al. | |
| 2019/0139243 A1 | 5/2019 | You et al. | |
| 2019/0154877 A1 * | 5/2019 | Capasso | G02B 5/18 |
| 2019/0324622 A1 | 10/2019 | Rotgans et al. | |
| 2021/0405255 A1 * | 12/2021 | Kress | H01L 25/0753 |

FOREIGN PATENT DOCUMENTS

| | | |
|---|---|---|
| JP | 2015-087431 A | 5/2015 |
| JP | 2018-537804 A | 12/2018 |
| JP | 2019-15970 A | 1/2019 |
| JP | 2019-86765 A | 6/2019 |
| JP | 2019-88765 A | 6/2019 |
| JP | 2019-516128 A | 6/2019 |
| JP | 2019-537804 A | 12/2019 |
| JP | 2020-537193 A | 12/2020 |
| WO | 2016/168173 A1 | 10/2016 |
| WO | 2019/046827 A1 | 3/2019 |

* cited by examiner

Primary Examiner — Robert E. Tallman
(74) Attorney, Agent, or Firm — Oliff PLC

(57) ABSTRACT

A metalens (wavefront control element) according to the present disclosure is a wavefront control element that controls a wavefront of incident light, and includes a plurality of metasurface regions. The plurality of metasurface regions are arranged in an array.

12 Claims, 9 Drawing Sheets

WAVEFRONT CONTROL ELEMENT, LIGHTING DEVICE, AND PROJECTOR

The present application is based on, and claims priority from JP Application Serial Number 2021-160802, filed Sep. 30, 2021, the disclosure of which is hereby incorporated by reference herein in its entirety.

BACKGROUND

1. Technical Field

The present disclosure relates to a wavefront control element, a lighting device, and a projector.

2. Related Art

A metamaterial is constituted by a structure having smaller dimensions than a wavelength, and is an artificial substance that exhibits a magnetic permeability that cannot be obtained in nature and a behavior that is not present in nature for electromagnetic waves including light. By using such a metamaterial, it is possible to implement an optical element that is difficult to implement with a typical refraction type optical element or diffraction type optical element, such as an optical element having a negative refractive index. Also, the metamaterial is constituted by a microstructure (structure) that is finer than a wavelength as described above, and is provided with a small and thin microresonator structure. Metamaterials are mainly divided into a one-dimensional structure such as a multilayer film including a periodic structure, a two-dimensional structure such as a nanoantenna or a metasurface element, or a three-dimensional structure such as a fishnet structure. As the dimension of a metamaterial is higher, the number of controllable optical properties increases, but there is a concern that a manufacturing error of microstructures may increase and deviation from the desired optical properties may increase. Visible light to be used in an image display device has a shorter wavelength than microwaves and infrared light, and thus, a manufacturing technique with higher accuracy is required for a metamaterial to be used in the image display device than for metamaterials to be used in devices that use microwaves and infrared light. Thus, a metamaterial to be used in an image display device practically has a one-dimensional structure or a two-dimensional structure such as a metasurface element.

For example, JP-T-2019-516128 discloses a metalens for imaging. The metalens is a type of metasurface. The shape, such as a height, a width, and a rotation angle, of a structure of the metalens is set according to a phase shift amount of light to be controlled by the metalens. The metalens is implemented by changing the shape of the structure of a nanometer (nm) order in a direction along the surface of a base material and forming a phase profile by which a lens function can be obtained.

For example, JP-A-2019-086765 discloses a metalens for a projector. Further, JP-T-2018-537804 discloses a metalens for a fluorescent lighting system. These metalenses exhibit a desired optical function with respect to visible light of projectors and fluorescence irradiation systems.

In design of metalenses disclosed in JP-T-2019-516128, JP-A-2019-086765, and JP-T-2018-537804, a phase modulation amount according to parameters related to a shape of a microstructure is calculated, and a microstructure in which the desired phase modulation amount that has been calculated can be obtained is disposed on a surface of a base material. In evaluating a phase modulation amount and actual dimensions of a shape of a microstructure that have been designed, electromagnetic wave analysis such as a finite difference time domain (FDTD) method is used because the actual dimensions are less than or equal to the wavelength of light. However, along with increasing an area of a surface of the base material, a calculation load for design evaluation of the actual dimensions and arrangement of a microstructure is increased, and a calculation time is increased. In particular, in a case where a metalens acts on visible light, as with the metalenses disclosed in JP-A-2019-086765 and JP-T-2018-537804, the surface of the base material has a size of a centimeter (cm) order, and thus, an enormous calculation load is applied and it takes a long time for calculation to evaluate the actual dimensions and arrangement of the microstructure. As a result, for calculating the actual dimensions and arrangement of the microstructure and evaluating the design, introducing machine learning has been considered, but there is no practical use.

SUMMARY

An advantage of some aspects of the disclosure is to provide a wavefront control element configured to control a wavefront of incident light, and including a plurality of metasurface regions. The plurality of metasurface regions are arranged in an array, and each of the plurality of metasurface regions has a lens function. Each of the plurality of metasurface regions converges or diverges the incident light.

DESCRIPTION OF EXEMPLARY EMBODIMENTS

First Exemplary Embodiment

Below, a first exemplary embodiment according to the present disclosure will be described with reference to FIG. 1 to FIG. 8.

Figure 1:
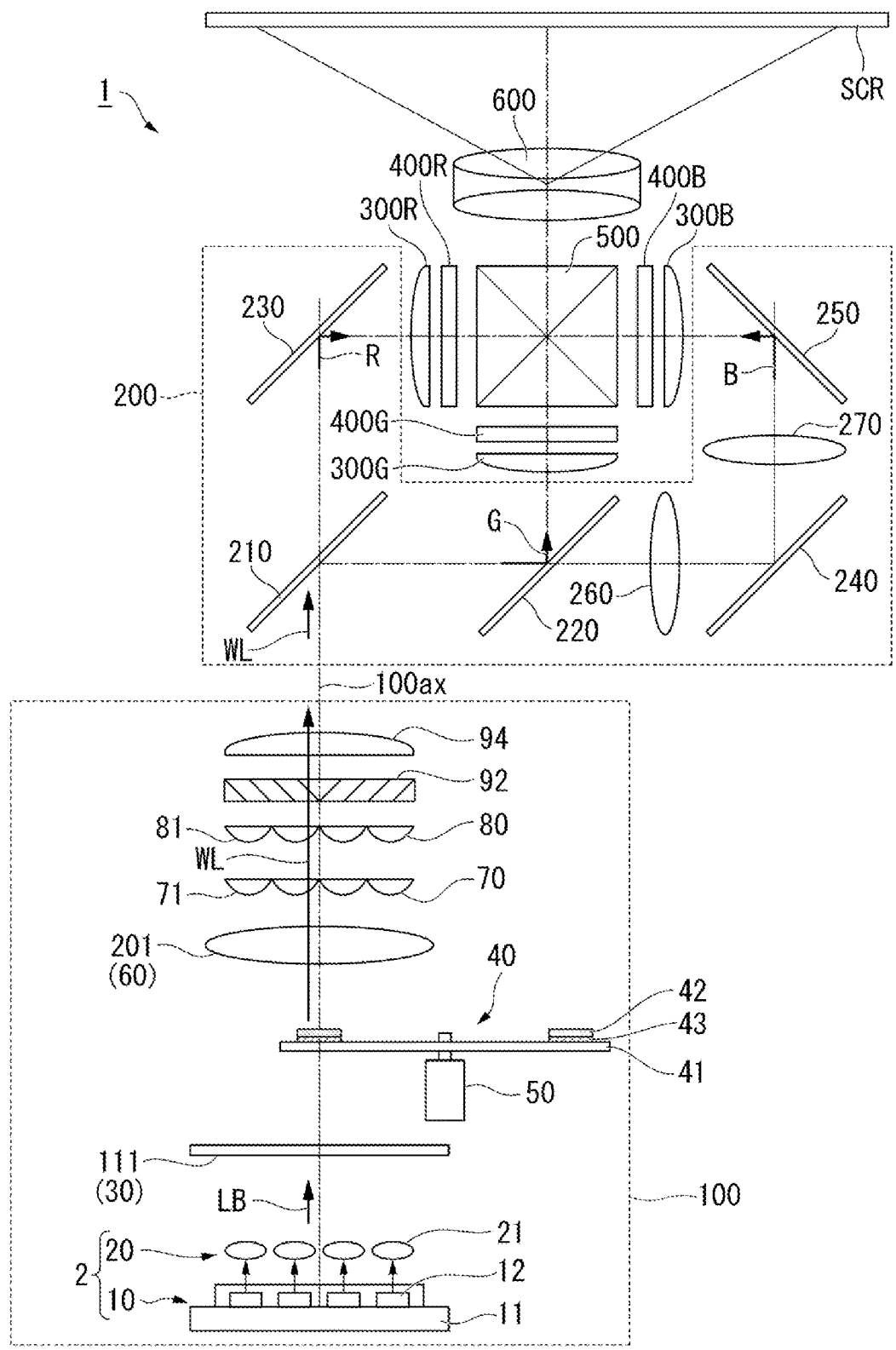
FIG. 1 is a schematic configuration diagram of a projector including a wavefront control element according to a first exemplary embodiment.

FIG. 1 is a schematic configuration diagram of a projector 1 including a wavefront control element according to the first exemplary embodiment. Note that, in the drawings, dimensions of some constituent elements may be differently scaled in order to easily see the constituent elements.

Projector

As illustrated in FIG. 1, a projector 1 includes a lighting device 100, a color separation optical system 200, light modulation devices 400R, 400G, and 400B, a cross dichroic prism 500, and a projection optical system 600. The lighting device 100 emits white light WL including red light (R), green light (G) and blue light (B).

The lighting device 100 includes a light source device 2, a converging optical system 30, a rotation fluorescent plate 40, a pickup optical system 60, a first lens array 70, a second lens array 80, a polarization conversion element 92, and a superimposing lens 94.

The light source device 2 includes a light source unit 10 and a collimating optical system 20. The light source unit 10 includes a substrate 11, and a plurality of light-emitting elements 12. The substrate 11 has a quadrangular shape such as, for example, a substantially square shape or a substantially rectangular shape in plan view. The substrate 11 has a mounting surface on which the light-emitting elements 12 are mounted, and the mounting surface is, for example, a flat surface. Note that a heat dissipation member such as a heat sink may be provided on a surface of the substrate 11 at the opposite side to the mounting surface. A material having high heat dissipation performance, for example, a metal material, is used as a material for forming the substrate 11.

The plurality of light-emitting elements 12 are arranged in an array with respect to the mounting surface of the substrate 11. In the configuration illustrated in FIG. 1, four rows in each of which four light-emitting elements 12 are arranged along one direction parallel to the mounting surface of the substrate 11 are arranged along a direction orthogonal to the one direction. The light-emitting element 12 is provided on the mounting surface of the substrate 11 with a supporting member (not illustrated) interposed therebetween. The light-emitting element 12 is a laser light source, and has an emitting surface that emits laser light. The light emitted by the light-emitting element 12 is, for example, blue light having a wavelength of 445 nm.

Each of light beams emitted from the light source unit 10 is incident on the collimating optical system 20. The collimating optical system 20 includes a plurality of collimating lenses 21. The collimating lenses 21 correspond one to one to the light-emitting elements 12. Thus, a light beam emitted from each of the light-emitting elements 12 is converted into a parallel light beam by the corresponding collimating lens 21.

The light source device 2 emits a plurality of light beams made to be parallel toward the converging optical system 30. Note that, hereinafter, a plurality of light beams emitted from the light source device 2 will be collectively referred to as a light beam bundle LB.

The converging optical system 30 includes a metalens (wavefront control element) 111. The converging optical system 30 is disposed in an optical path from the light source device 2 to the rotation fluorescent plate 40, and causes the substantially converged light beam bundle LB to be incident on a phosphor layer 42 of the rotation fluorescent plate 40 as excitation light. A detailed configuration of the metalens 111 will be described later.

The rotation fluorescent plate 40 includes the phosphor layer 42 and a dichroic film 43. The phosphor layer 42 is disposed on a circular plate 41 that is rotatable about an optical axis of the light beam bundle LB by a motor 50, and is provided along a circumferential direction of the circular plate 41. The circular plate 41 is formed by using a material that transmits blue light. Examples of the material of the circular plate 41 include quartz glass, quartz, sapphire, optical glass, transparent resin, and the like.

As described above, the light beam bundle LB emitted from the light source device 2 is incident on the phosphor layer 42 from a side of the circular plate 41 in a direction along the optical axis. The phosphor layer 42 is excited by the light beam bundle LB. The phosphor layer 42 converts a part of the light beam bundle LB from the light source device 2 into fluorescence, and passes the remaining part of the light beam bundle LB without conversion. The phosphor layer 42 is constituted by, for example, a layer containing a YAG-based phosphor (Y, Gd)$_3$(Al, Ga)$_5$O$_{12}$:Ce.

The dichroic film 43 is provided between the phosphor layer 42 and the circular plate 41, transmits the light beam bundle LB constituted by blue laser light, and reflects fluorescence. In this way, the rotation fluorescent plate 40 synthesizes a part of the light beam bundle LB of blue transmitted through the phosphor layer 42 and fluorescent light emitted from the phosphor layer 42, and emits white light WL toward the pickup optical system 60.

The pickup optical system 60 includes a lens 201, and substantially collimates the white light WL emitted from the rotation fluorescent plate 40. The lens 201 is constituted by a convex lens, for example, but may be constituted by a lens optical system including a plurality of convex lenses.

The white light WL collimated by the pickup optical system 60 is incident on the first lens array 70. The first lens array 70 includes a plurality of small lenses 71 for dividing light from the pickup optical system 60 into a plurality of partial light beam bundles. The plurality of small lenses 71 are arranged in a matrix in a plane orthogonal to an illumination optical axis 100ax of the lighting device 100. The second lens array 80 includes a plurality of small lenses 81 corresponding to the plurality of small lenses 71 of the first lens array 70. The second lens array 80, together with the superimposing lens 94, causes an image of each small lens 71 of the first lens array 70 to be imaged in the vicinity of an image forming region of each of the light modulation devices 400R, 400G, and 400B. The plurality of small lenses 81 are arrayed in a matrix in a plane orthogonal to the illumination optical axis 100ax.

The polarization conversion element 92 converts each partial light beam bundle divided by the first lens array 70 into linearly polarized light. The polarization conversion element 92 includes a polarization separation layer, a reflection layer, and a retardation plate. The polarization separation layer of the polarization conversion element 92 transmits a linearly polarized light component that is one of polarized light components included in the white light WL emitted from the lighting device 100, and reflects the other linearly polarized light component in a direction perpendicular to the illumination optical axis 100ax. The reflection layer of the polarization conversion element 92 reflects the other linearly polarized light component reflected by the polarization separation layer in a direction parallel to the illumination optical axis 100ax. The retardation plate of the polarization conversion element 92 converts the other linearly polarized light component reflected by the reflection layer into the one linearly polarized light component.

The superimposing lens 94 converges the partial light beam bundles from the polarization conversion element 92 to superimpose the converged partial light beam bundles on the vicinity of the image forming region of each of the light modulation devices 400R, 400G, and 400B. The first lens array 70, the second lens array 80, and the superimposing lens 94 constitute an integrator optical system that uniformizes an in-plane light intensity distribution of the white light WL from the lighting device 100 in the image forming region.

The color separation optical system 200 includes dichroic mirrors 210 and 220, reflection mirrors 230, 240, and 250, and relay lenses 260 and 270. The color separation optical system 200 separates the white light WL emitted from the lighting device 100 into red light R, green light G, and blue light B, and guides the red light R, the green light G, and the blue light B to the light modulation devices 400R, 400G, and 400B corresponding thereto, respectively. Field lenses 300R, 300G, and 300B are disposed between the color separation optical system 200 and the light modulation devices 400R, 400G, and 400B.

The dichroic mirror 210 passes a red light component, and reflects a green light component and a blue light component. The dichroic mirror 220 reflects a green light component, and passes a blue light component. The reflection mirror 230 reflects a red light component. The reflection mirrors 240 and 250 reflect a blue light component.

Each of the light modulation devices 400R, 400G, and 400B is constituted by a liquid crystal panel configured to modulate each color light being incident thereon according to image information and to form an image. An operation mode of the liquid crystal panel may be any of a TN mode, a VA mode, a traverse electric field mode, and the like, and is not limited to a specific mode. Each of the light modulation devices 400R, 400G, and 400B includes an incident side polarizing plate (not illustrated) disposed at a light incident surface side, and an emission side polarizing plate (not illustrated) disposed at a light emission surface side.

The cross dichroic prism 500 synthesizes imaging light emitted from each of the light modulation devices 400R, 400G, and 400B to form a color image. The cross dichroic prism 500 is configured by bonding four right-angle prisms, and has a substantially square shape in plan view. A dielectric multilayer film is formed on a substantially X-shaped interface in which the right-angle prisms are bonded to each other in the cross dichroic prism 500.

The color image emitted from the cross dichroic prism 500 is enlarged and projected by the projection optical system 600 to form an image on a screen SCR.

Wavefront Control Element

Next, the metalens 111 used in the lighting device 100 of the projector 1 described above will be described. The metalens 111 according to the first exemplary embodiment is a wavefront control element that controls a wavefront of the light beam bundle (incident light) LB constituted by blue light that is incident from the light source device 2, and specifically, converts a parallel wavefront substantially collimated of the light beam bundle LB into a converging wavefront that converges toward a predetermined light converging point or light converging region of the phosphor layer 42 of the rotation fluorescent plate 40.

In the following, a direction parallel to the optical axis AX of the light beam bundle LB incident on the metalens 111 is referred to as a Z direction, one side relatively in the Z direction is referred to as a +Z side, and the other side relatively in the Z direction is referred to as a −Z side. Also, a direction orthogonal to the Z direction is referred to as an X direction, one side relatively in the X direction is referred to as a +X side, and the other side relatively in the X direction is referred to as a −X side. Also, a direction being in the same plane as the X direction and being orthogonal to both the X direction and the Y direction is referred to as a Y direction, one side relatively in the direction Y is referred to as a +Y side, and the other side relatively in the Y direction is referred to as a −Y side.

Figure 2:
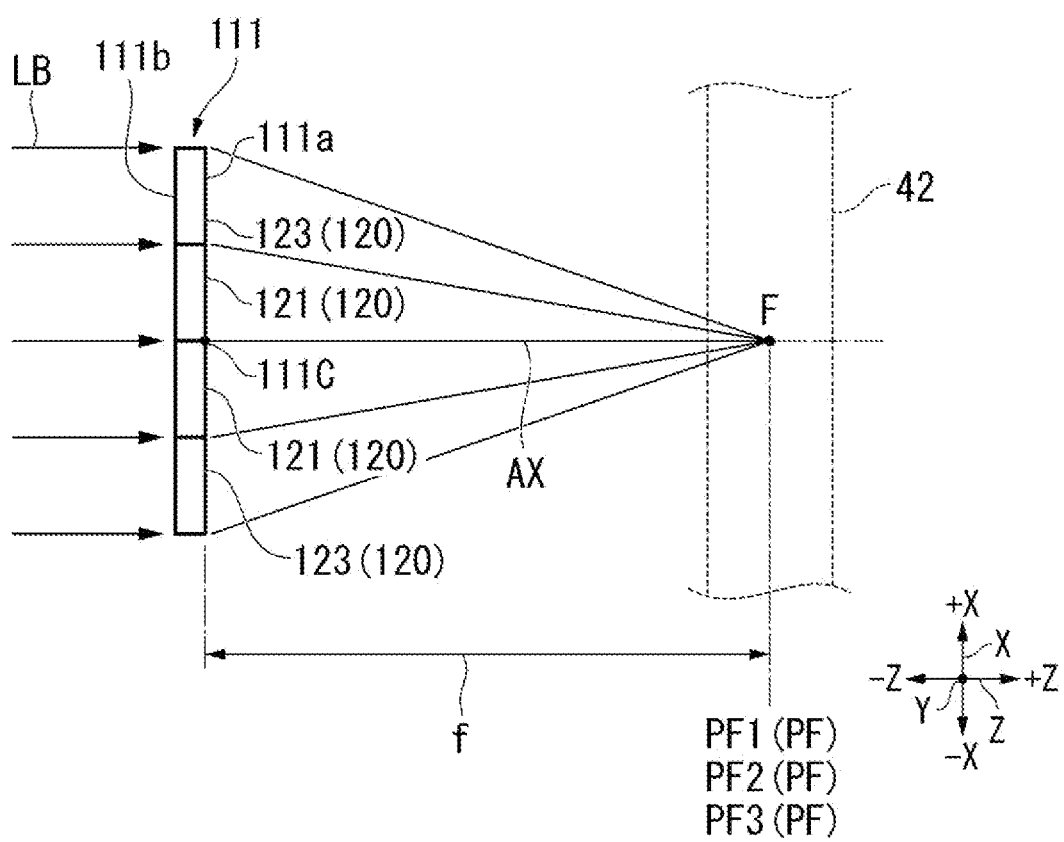
FIG. 2 is a side view of the wavefront control element of the first exemplary embodiment.
Figure 3:
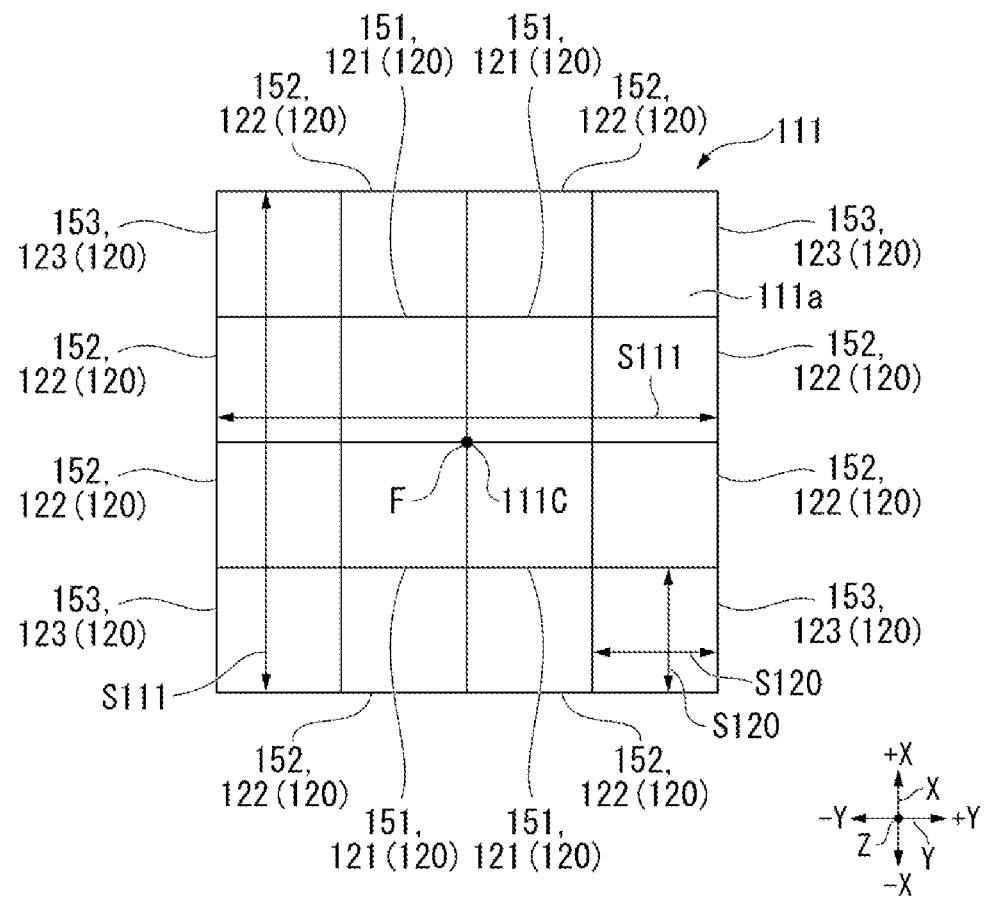
FIG. 3 is a front view of the wavefront control element illustrated in FIG. 1.

FIG. 2 is a side view of the metalens 111. FIG. 3 is a front view of the metalens 111. As illustrated in FIG. 2 and FIG. 3, the metalens 111 includes a plurality of metasurface regions 120. The plurality of metasurface regions 120 are arranged in an array in an XY plane including the X direction and the Y direction. That is, the metalens 111 includes a plurality of metasurface regions 120 arranged with relative positional relationships to each other so as to be capable of functioning as one optical element as a whole, rather than includes a plurality of metasurface regions arranged without any connection to relative positional relationships to each other.

The metalens 111 is constituted by a plurality of metasurface regions 120 disposed adjacent to each other in the X-direction and the Y-direction illustrated in FIG. 2. The metalens 111 is constituted by four metasurface regions 120 in each of the X direction and the Y direction, for example, as illustrated in FIG. 2, and is constituted by 16 metasurface regions 120 in total in the XY plane as illustrated in FIG. 3.

The metalens 111 is formed in a rectangular shape in plan view along the Z direction. Each of the metasurface regions 120 is formed in a rectangular shape in plan view along the Z direction. S111=4×S120, wherein a size of the metalens 111 in the X direction and the Y direction is referred to as a dimension S111, and a size of the metasurface region 120 in the X direction and the Y direction is referred to as a dimension S120. The dimension S111 is a centimeter (cm) order, whereas the dimension S120 is a micron (μm) order.

The plurality of metasurface regions 120 of the metalens 111 are classified into four types of metasurface regions 121, 122, and 123. Each of the metasurface regions 121 to 123 is a transmission-type metasurface region, and is constituted by each of the transmission-type metalenses 151 to 153. As illustrated in FIG. 3, the metasurface regions 121 are disposed in four metasurface regions 120 disposed at the center side in the XY plane of the metalens 111. The metasurface regions 122 and 123 are disposed in a total of 12 metasurface regions 120 positioned around the four metasurface regions 120 disposed at the center side in the XY plane of the metalens 111.

As illustrated in FIG. 2 and FIG. 3, the center of the metalens 111 in the X direction and the Y direction overlaps the optical axis AX. A focal point (one point) F of the metalens 111 is set at the +Z side of a surface positioned at the +Z side of the metalens 111 so as to be away from the surface by a focal distance f. Note that the focal point F is the same as the predetermined light converging point of the phosphor layer 42 of the rotation fluorescent plate 40 in the lighting device 100 of the projector 1 described with reference to FIG. 1. In other words, the metalens 111 converges the incident light beam bundle LB to the focal point F inside the phosphor layer 42.

For the metalens 111, the focal positions PF of the plurality of the metasurface regions 120 are identical to each other. That is, a focal position PF1 of the metasurface region (first metasurface region) 121, a focal position PF2 of the metasurface region (second metasurface region) 122, and a focal position PF3 of the metasurface region (third metasurface region) 123 are identical to each other. Thus, for each of the types of the metasurface regions, the center and the focal point F in the XY plane of the metalens 151 constituting the metasurface region 121 are set at different positions from each other in the X direction and the Y direction. As described above, specifically, the metalens 111 is constituted by the 4×4 metasurface regions 120, and the center and the focal point F of the metalens 111 overlap with each other in the XY plane, and thus, when viewed along the Z direction, for the metalens 151, the focal point F is positioned at any one corner of the four corners thereof.

The centers and the focal points F of the metalenses 152 and 153 constituting the metasurface regions 122 and 123 in the XY plane are set at different positions from each other in the X direction and the Y direction. For the metalenses 152 and 153, the focal point F is positioned outside the region thereof when viewed along the Z direction. That is, each of the metalenses 151 to 153 is an off-axis type lens. Also, the metalenses 152 and 153 are lenses having a larger off-axis amount than that of the metal lens 151. Furthermore, the metalens 153 is a lens having a larger off-axis amount than that of the metal lens 152.

Figure 4:
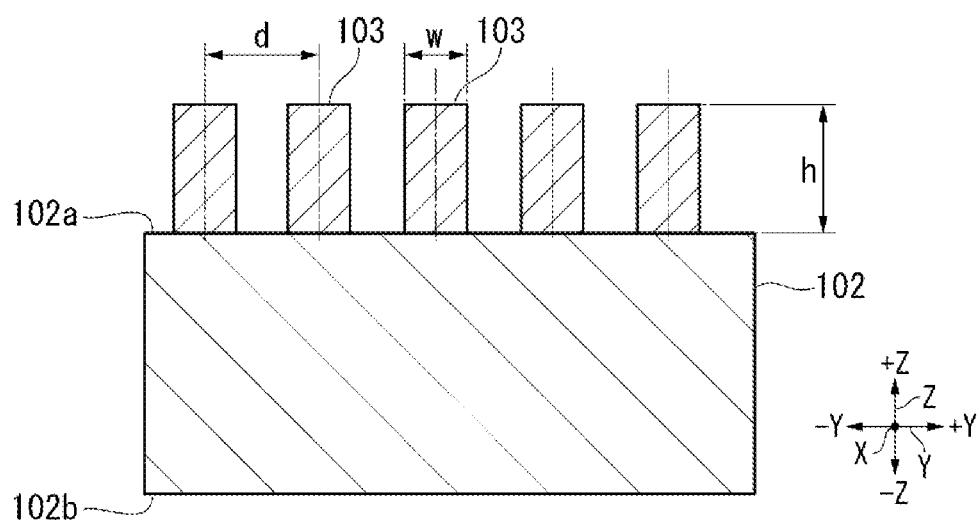
FIG. 4 is a cross-sectional view of a metasurface region of the wavefront control element illustrated in FIG. 1.

FIG. 4 is a cross-sectional view of the metasurface region 120 cut parallel to the XY plane. The metasurface region 120 includes a base material 102 having a flat plate shape and a plurality of structures 103. A front surface 102$a$ at the +Z-side of the base material 102 and a back surface 102$b$ at the −Z side are parallel to the XY plane, and extend in the XY plane. A size of the base material 102 in the X direction and the Y direction is the dimension S120. A size of the base material 102 in the Z direction is not particularly limited, and is appropriately set according to the wavelength of the light beam bundle LB, the optical performance where the projector 1 is required, and the like. Note that the base materials 102 of the plurality of metasurface regions 120 may be integrally formed with each other, and may be bonded when arranged in the X direction and the Y direction after being separately formed.

The plurality of structures 103 are disposed at intervals d from each other on the surface 102$a$ of the base material 102. Each structure 103 has a width t (not illustrated) in the X direction, a width w in the Y direction, and a height h in the Z direction. Note that, in FIG. 4, the widths w of the plurality of structures 103 are illustrated as an example so as to be substantially the same dimensions as each other, but the respective widths t and w of the plurality of structures 103 are independently designed from each other based on a policy, which will be described below. That is, any of a case where the respective widths t and w of the structures 103 and 103 adjacent to each other in the XY plane are the same dimensions as each other and a case where the respective widths t and w are different dimensions from each other may occur. Note that in each of FIG. 3 and FIG. 5 to FIG. 7, the plurality of structures 103 are omitted.

The base material 102 and the plurality of structures 103 are formed by using a material having a high transmittance with respect to a wavelength band of the light beam bundle LB. When the wavelength of the light beam bundle LB is within a visible wavelength range, and for example, is 445 nm, examples of the materials of the base material 102 and the plurality of structures 103 include optical glass, silicon oxide ($SiO_2$), titanium oxide ($TiO_2$), and the like.

Figure 5:
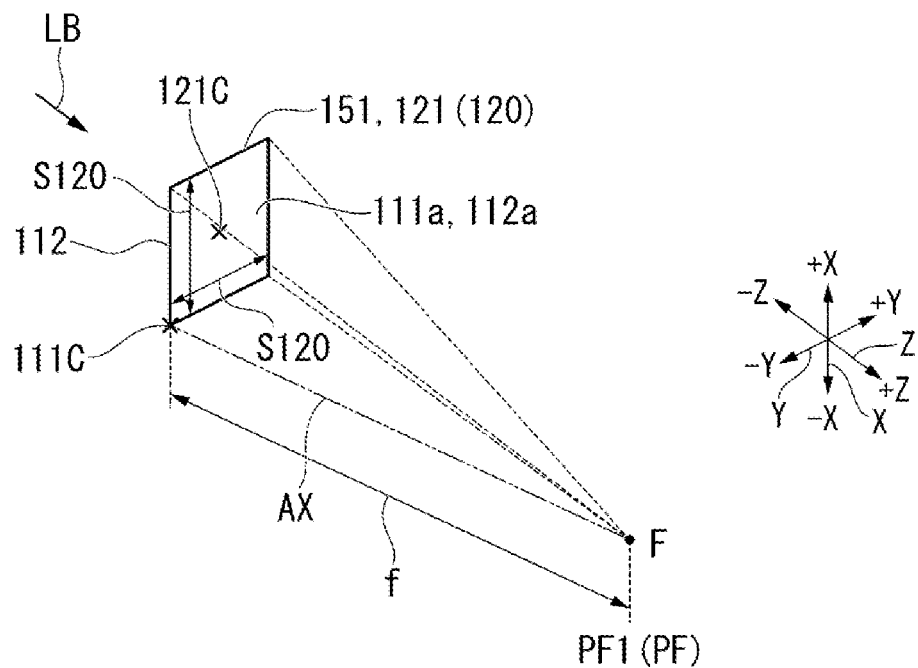
FIG. 5 is a perspective view for describing design of the metasurface region of the wavefront control element illustrated in FIG. 1.

FIG. 5 is a perspective view for describing design of the metalens 151 constituting the metasurface region 121. As illustrated in FIG. 5, a center 121C in the X direction and the Y direction of the metalens 151 and the focal point F being present at the focal position PF1 are separated by the dimension S120×(½) in each of the X direction and the Y direction, and are separated by the focal distance f in the Z direction. The respective widths t and w of the plurality of structures 103 (not illustrated) of the metasurface region 121, the interval d between the structures 103 adjacent to each other in the XY plane, and an extending direction of the structure 103 are designed according to the dimension S120, the focal distance f, and the center wavelength (wavelength, peak wavelength) of the light beam bundle LB such that the light beam bundle LB incident on the metasurface region 121 converges to the focal point F at the +Z side separated by each dimension in the X direction, y direction, and Z direction as described above. The height h of the plurality of structures 103 of the metasurface region 121 is set according to the center wavelength of the light beam bundle LB and a phase modulation amount required for the metalens 151.

For the metasurface region 121 illustrated in FIG. 5, when viewed along the Z direction, the focal point F overlaps a corner at the −X side and the −Y side of the metaface region 121. The metasurface region 121 illustrated in FIG. 5 corresponds to the metasurface region 121 positioned at the +X side and the +Y side among the four metasurface regions 121 illustrated in FIG. 3. The shapes and distributions of the plurality of structures 103 of the three metasurface regions 121 other than the metasurface region 121 positioned at the +X side and the +Y side can be obtained by inverting or rotating the shape and distribution of the plurality of structures 103 of the metasurface region 121 positioned at the +X side and the +Y side according to the relative arrangement with respect to the metasurface region 121 positioned at the +X side and the +Y side.

For example, among the four metasurface regions 121 exemplified in FIG. 3, the shape and distribution of the plurality of structures 103 of the metasurface region 121 positioned at the +X side and the −Y side are a shape and distribution obtained by inverting the shape and distribution of the plurality of structures 103 of the metasurface region 121 positioned at the +X side and the +Y side about an imaginary axis parallel to the X direction through the center 111C in the XY plane of the metalens 111. By taking into account the symmetry with respect to the center 111C in this manner, the number of types of the shape and distribution of the plurality of structures 103 of each of the four metasurface regions 121 is one.

Figure 6:
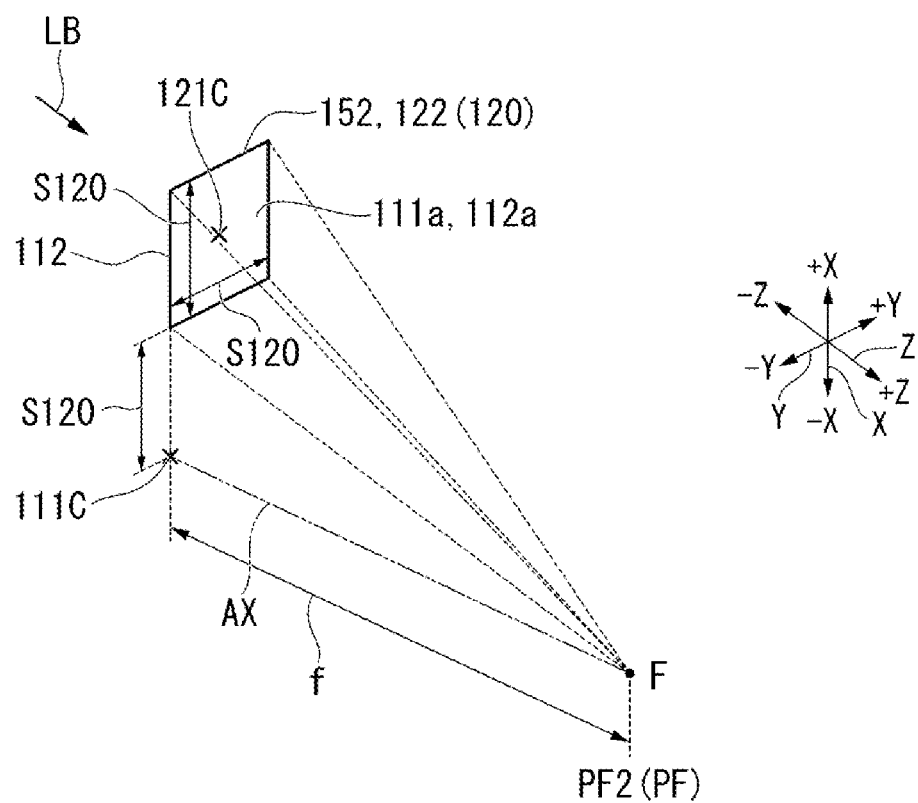
FIG. 6 is a perspective view for describing design of another metasurface region of the wavefront control element illustrated in FIG. 1.

FIG. 6 is a perspective view for describing design of the metalens 152 that constitutes the metasurface region 122. As illustrated in FIG. 6, the center 121C in the X direction and the Y direction of the metalens 152 and the focal point F being present in the focal position PF2 are separated by the dimension S120×(3/2) in the X direction, are separated by the dimension S120×(½) in the Y direction, and are separated by the focal distance f in the Z direction. The respective widths t and w of the plurality of structures 103 (not illustrated) of the metasurface region 122, the interval d between the structures 103 adjacent to each other in XY plane, and an extending direction of the structure 103 are designed according to the dimension S120, the focal distance f, and the center wavelength (wavelength, peak wavelength) of the light beam bundle LB such that the light beam bundle LB incident on the metasurface region 122 converges to the focal point F at the +Z side separated by each dimension in the X direction, y direction, and Z direction as described above. The height h of the plurality of structures 103 of the metasurface region 122 is set according to the center wavelength of the light beam bundle LB and a phase modulation amount required for the metalens 152.

For the metasurface region 122 exemplified in FIG. 6, when viewed along the Z direction, the focal point F is positioned at the −X side and the −Y side being less than the metasurface region 122. The metasurface region 122 exemplified in FIG. 6 corresponds to the metasurface region 122 at the +X side and the +Y side being the largest among the eight metasurface regions 122 exemplified in FIG. 3. The shapes and distributions of the plurality of structures 103 of the seven metasurface regions 122 other than the metasurface region 122 at the +X side and the +Y side being the largest can be obtained by inverting or rotating the shape and distribution of the plurality of structures 103 of the metasurface region 122 at the +X side and the +Y side being the largest, according to the relative arrangement with respect to the metasurface region 122 at the +X side and the +Y side being the largest.

For example, among the eight metasurface regions 122 exemplified in FIG. 3, the shape and distribution of the plurality of structures 103 of the metasurface region 122 at the +Y side and the +X side being the largest are a shape and distribution obtained by inverting the shape and distribution of the plurality of structures 103 of the metasurface region 122 at the +X side and the +Y side being the largest about an imaginary axis forming 45° with respect to the +X side in the X direction and the +Y side in the Y direction through the center 111C of the metalens 111. By taking into account the symmetry with respect to the center 111C in this manner, the number of types of the shape and distribution of the plurality of structures 103 of each of the eight metasurface regions 122 is one.

Figure 7:
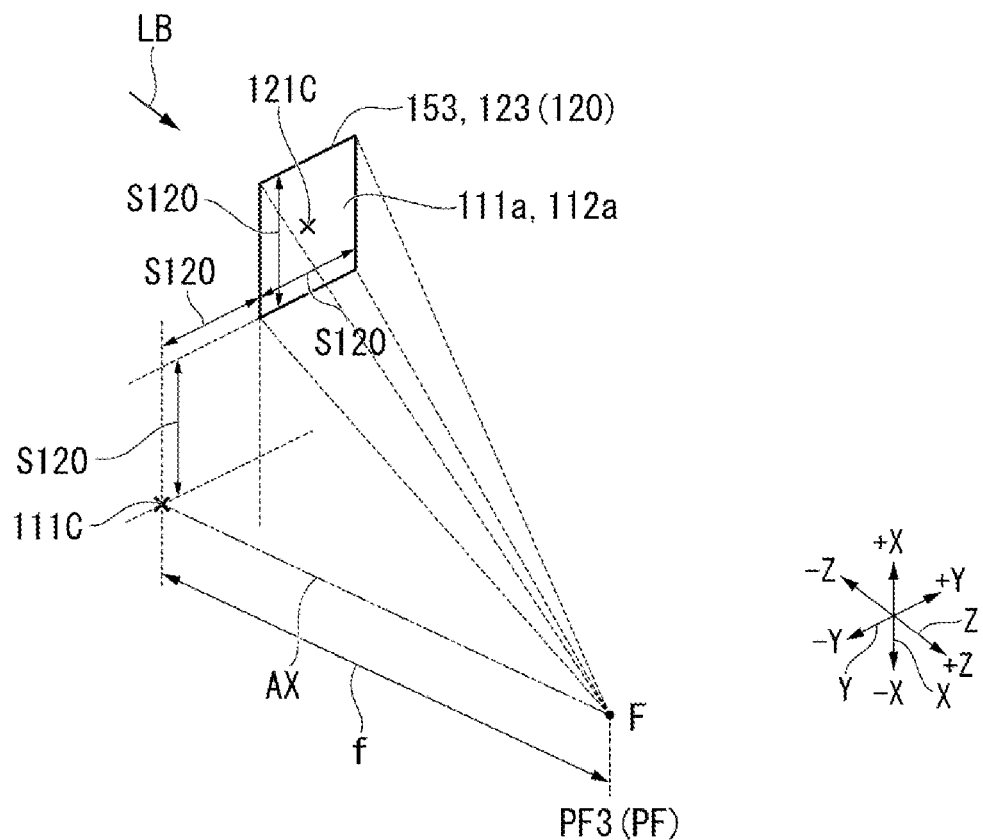
FIG. 7 is a perspective view for describing design of yet another metasurface region of the wavefront control element illustrated in FIG. 1.

FIG. 7 is a perspective view for describing design of the metalens 153 constituting the metasurface region 123. As illustrated in FIG. 7, the center 121C in the X direction and the Y direction of the metalens 153 and the focal point F being present at the focal position PF3 are separated by the dimension S120×(3/2) in each of the X direction and the Y direction, and are separated by the focal distance f in the Z direction. The respective widths t and w of the plurality of structures 103 (not illustrated) of the metasurface region 123, the interval d between the structures 103 adjacent to each other in the XY plane, and an extending direction of the structure 103 are designed according to the dimension S120, the focal distance f, and the center wavelength (wavelength, peak wavelength) of the light beam bundle LB such that the light beam bundle LB incident on the metasurface region 123 converges to the focal point F at the +Z side separated by each dimension in the X direction, the Y direction, and the Z direction as described above. The height h of the plurality of structures 103 of the metasurface region 123 is set according to the center wavelength of the light beam bundle LB and a phase modulation amount required for the metalens 153.

For the metasurface region 123 exemplified in FIG. 7, when viewed along the Z direction, the focal point F is positioned at the −X side and the −Y side being less than the metaface region 123. The metasurface region 123 exemplified in FIG. 7 corresponds to the metasurface region 123 positioned at the +X side and the +Y side among the four metasurface regions 123 exemplified in FIG. 3. The shapes and distributions of the plurality of structures 103 of the three metasurface regions 123 other than the metasurface region 123 positioned at the +X side and the +Y side can be obtained by inverting or rotating the shape and distribution of the plurality of structures 103 of the metasurface region 123 positioned at the +X side and the +Y side according to the relative arrangement with respect to the metasurface region 123 positioned at the +X side and the +Y side.

For example, among the eight metasurface regions 123 exemplified in FIG. 3, the shape and distribution of the plurality of structures 103 of the metasurface region 123 positioned at the −Y side and the −X side are a shape and distribution obtained by rotating the shape and distribution of the plurality of structures 103 of the metasurface region 123 positioned at the +X side and the +Y side by 180° in the XY plane with the center 111C of the metalens 111 serving as the reference. By taking into account the symmetry with respect to the center 111C in this manner, the number of types of the shape and distribution of the plurality of structures 103 of each of the four metasurface regions 123 is one.

The shape and distribution of the plurality of metasurface regions 120 of the metalens 111 are designed by calculation of the shape and distribution of each of the three types of metasurface regions 121 to 123. The design of the shape of the structure 103 and the distribution of the plurality of structures 103 of each of the three types of metasurface regions 121 to 123 is made by determining an ideal phase distribution of each of the metalenses 151 to 153 from the above-described positional relationship between the position of each of the corresponding metalenses 151 to 153 and the focal point F, and determining dimensions related to the structures 103 such as the widths t and w, and the interval d according to the ideal phase distribution. The determination of the dimensions related to the structures 103 according to the ideal phase distribution may be performed similarly to the design of a known metalens. For the design of the shape and distribution of each of the three types of metasurface regions 121 to 123 by using electromagnetic wave analysis, for example, JP-T-2019-516128 described above can be referred. The design evaluation of the shape and distribution of each of the three types of metasurface regions 121 to 123 is performed by using electromagnetic wave analysis such as an FDTD method. Since the structure 103 is a microstructure equal to or less than the center wavelength of the light beam bundle LB, differences between the dimensions related to the designed structures 103 and the actual dimensions of the structures 103 of the manufactured metalens 111 largely affect an optical function of the metalens 111, and the design evaluation using the electromagnetic wave analysis is necessary for the practical use of the metalens 111.

The metalens 111 according to the first exemplary embodiment described above is a wavefront control element that controls the wavefront of the light beam bundle LB, and includes the plurality of metasurface regions 120. The plurality of metasurface regions 120 are arranged in an array in the XY plane. For the metalens 111 according to the first exemplary embodiment, the design of the structures of the metasurface constituting the entire metalens 111 can be performed by designing the shape and distribution of the structures 103 of each of the three types of the metasurface regions 121 to 123. Since the widths t and w, and the height h of the structures 103 of each of the plurality of metasurface regions 120 of the metalens 111 is equal to or less than the center wavelength of the light beam bundle LB, the electromagnetic wave analysis is necessary for designing the shape of the structure 103 and the distribution of the plurality of structures 103. The dimension S111 of the metalens 111 that is used for the projector 1 and that controls the wavefront of the light beam bundle LB constituted by blue light is a cm order. When the shape of the structure 103 and the distribution of the plurality of structures 103 throughout the entire metalens 111 are collectively designed as in the related art by using the FDTD method or the like, the calculation load and the calculation time are rapidly increased, which is not practical. On the other hand, with the metalens 111 according to the first exemplary embodiment, designing the shape of the structure 103 and the distribution of the plurality of structures 103 of each of the metasurface regions 120 of a μm order, specifically, the three metasurface regions 121 to 123 can suppress the calculation load and calculation time when the electromagnetic wave analysis such as the FDTD method is used to a practical level. With the metalens 111 according to the first exemplary embodiment, it is possible to implement a lens of a cm order to be used for the projector 1 while reducing the calculation load in the design evaluation by arranging the plurality of metasurface regions 120, that is, the metalenses 151 to 153 of a μm order in an array. With the metalens 111 according to the first exemplary embodiment, an enormous calculation load does not need to be applied and it does not take a long time for calculation to evaluate the design of the actual dimensions and arrangement of the structures 103.

In the metalens 111 according to the first exemplary embodiment, the plurality of metasurface regions 120 have the metasurface regions 121, and the metasurface regions 122 and 123. The focal position PF1 of the metasurface region 121 and the focal positions PF2 and PF3 corresponding to the metasurface regions 122 and 123 are identical to each other. The metalens 111 converges the light beam bundle LB to the focal point F at the side opposite to the incident side, that is, at the +Z side, in the Z direction along the optical axis AX of the incident light beam bundle LB. Specifically, the metasurface regions 121 to 123 converge the light beam bundle LB to the focal point F that is identical and common to each other. With the metalens 111 according to the first exemplary embodiment, it is possible to implement an off-axis type converging lens of a cm order in which the calculation load and the calculation time of the electromagnetic wave analysis are decreased to about a practical level.

With the metalens 111 according to the first exemplary embodiment, each of the plurality of metasurface regions 120 is a transmission-type metasurface. With the metalens 111 according to the first exemplary embodiment, it is possible to implement a transmission-type converging lens in which the calculation load and the calculation time of the electromagnetic wave analysis are decreased to about a practical level.

Note that, regarding the metalens 111 according to the first exemplary embodiment described above, the 16 metasurface regions 120 in total that are arranged in a 4×4 array in the XY plane are exemplified, as illustrated in FIG. 2 and FIG. 3, as the plurality of metasurface regions 120 constituting the metalens 111. However, the number of the metasurface regions 120 included in the metalens 111 is not limited to 16. The dimension S120 of the plurality of the metasurface regions 120 is preferably set according to suitable and practical dimensions for evaluating the design by using the electromagnetic wave analysis such as FDTD. When the dimension S111 of the metalens 111 is constant, the number of the metasurface regions 120 in an array increases as the dimension S120 of the metasurface region 120 decreases. Along with an increase in the number of the metasurface regions 120 of the metalens 111 in the array, as the number of types of the shape and distribution of the plurality of structures 103 of the metasurface region 120 increases, the calculation number of times and the calculation load of the electromagnetic wave analysis in evaluating the design rapidly increase. However, among the plurality of metasurface regions 120, the number of types of the shape and distribution of the plurality of structures 103 of the metasurface region 120 can be suppressed by disposing two or more metasurface regions 120 at positions symmetrical to each other with respect to the center 111C of the metalens 111, and thus, the calculation number of times and the calculation load of the electromagnetic wave analysis in evaluating the design can be suppressed to a practical level.

In the metalens 111 according to the first exemplary embodiment, the plurality of the metasurface regions 120 are disposed so as to be symmetrical to each other with respect to the center 111C of the metalens 111 as viewed from the Z direction parallel to the light beam bundle LB. Specifically, as illustrated in FIG. 3, the four metasurface regions 121 are symmetrical to each other with respect to the X direction or the Y direction through the center 111C, or are disposed so as to be rotationally symmetrical with respect to the center 111C. Also, the eight metasurface regions 122 are symmetrical to each other with respect to the X direction or the Y direction through the center 111C, or are disposed so as to be rotationally symmetrical with respect to the center 111C. Furthermore, the metasurface regions 123 are symmetrical to each other with respect to the X direction or the Y direction through the center 111C, or are disposed so as to be rotationally symmetrical with respect to the center 111C. Due to these, the design and evaluation of the shape of the structure 103 and the distribution of the plurality of structures 103 of the metasurface regions 120 of the metalens 111 in which the number in the array is set to 16 can be performed by the design and evaluation of the shape of the structure 103 and the distribution of the plurality of structures 103 of each of the metasurface regions 121 to 123, that is, the shapes of three types of structures 103 and the distributions of the plurality of structures 103. That is, by providing symmetry to the relative arrangement of the metasurface regions 121 to 123, the calculation time and the calculation load in evaluating the design of the metalens 111 having the number in the array set to 16 can be reduced to approximately (3/16) the calculation time and the calculation load of 16 types of metasurface regions 120.

Figure 8:
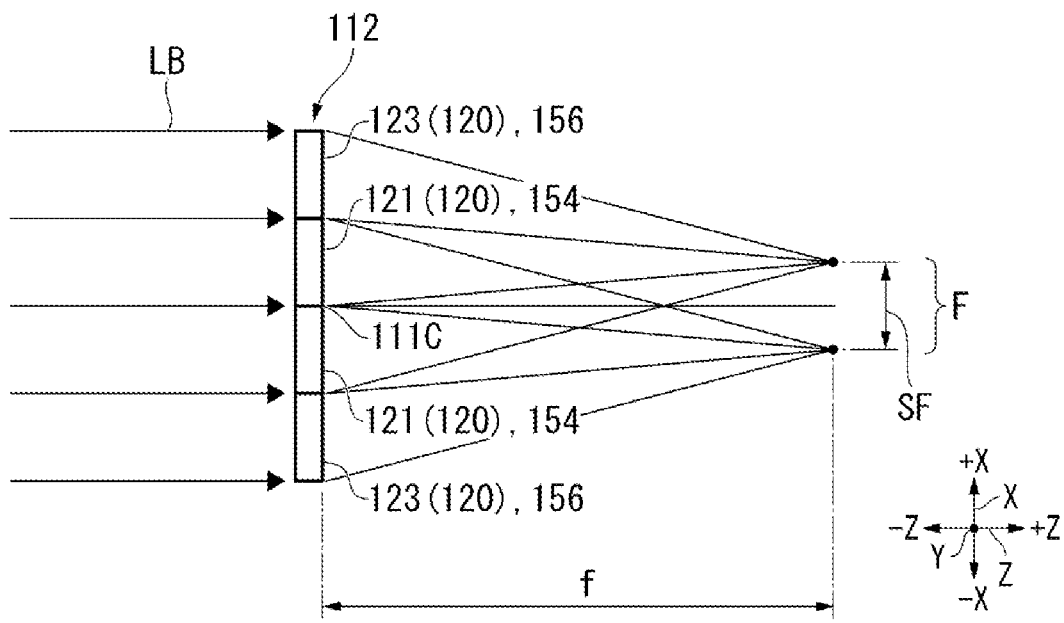
FIG. 8 is a side view of a wavefront control element according to a modified example of the first exemplary embodiment.

FIG. 8 is a side view of a metalens 112 according to a modified example of the metalens 111 according to the first exemplary embodiment. In FIG. 2, the focal point F is illustrated in a point shape. In other words, the dimension S120 of the metasurface region 120 of the metalens 111 is larger than a size of the focal point F to the extent that the focal point F is considered to be a point. However, as illustrated in FIG. 8, the dimension S120 of the metasurface region 120 of the metalens 112 may be equivalent to a dimension SF in the X direction and the Y direction of the focal point F. In the metalens 112, the metasurface regions 121 to 123 are respectively constituted by metagratings 154 to 156 of transmission type. Note that in FIG. 8, the metasurface region 122 and the metagrating 155 do not appear. The respective metagratings 154 to 156 deflect the light beam bundle LB incident as parallel light beams toward the focal points F.

Also in the metalens 112 according to the modified example of the first exemplary embodiment, similarly to the metalens 111 according to the first exemplary embodiment, the dimension S120 of the plurality of the metasurface regions 120 is preferably set to a suitable and practical dimension in order to evaluate the design by using electromagnetic wave analysis such as FDTD. In addition, it is also preferable to reduce the number of types of the shape of the structure 103 and the distribution of the plurality of structures 103 of the metasurface region 120 by providing symmetry to the relative arrangement of the metasurface regions 121 to 123.

The lighting device 100 according to the first exemplary embodiment includes the metalens 111 as the converging optical system 30. With the lighting device 100 according to the first exemplary embodiment, the metalens 111 in which the calculation load, and the calculation time/the number of times of calculation of the electromagnetic wave analysis in evaluating the design as described above can be suitably suppressed to a practical level is used to implement the converging optical system 30 being an ultra-thin type. With the lighting device 100 according to the first exemplary embodiment, the entire device can be miniaturized and be made thinner.

The projector 1 according to the first exemplary embodiment includes the above-described metalens 111. With the projector 1 according to the first exemplary embodiment, various optical elements having a size of a cm order and including the metalens 111 used in the lighting device 100 are arrayed in the metasurface region 120 of a μm order, and thus, while reducing the calculation load, and the calculation time/the number of times of calculation of the electromagnetic wave analysis in evaluating the design, it is possible to include various optical elements that are ultra-thinner than typical optical elements to reduce the entire size and thickness.

Note that in the projector 1 according to the first exemplary embodiment, in addition to the converging optical system 30, the lens 201 of the pickup optical system 60 may be constituted by a metalens in which a plurality of metasurface regions 120 are arrayed, similarly to the metalens 111. In addition, in the projector 1 according to the first exemplary embodiment, at least any one of the relay lenses 260 and 270 of the color separation optical system 200 may be constituted by a metalens in which a plurality of metasurface regions 120 are arrayed, similarly to the metalens 111. Also, in the projector 1 according to the first exemplary embodiment, at least one type of small lenses of the plurality of small lenses 71 of the first lens array 70 and the plurality of small lenses 81 of the second lens array 80 may be constituted by a metalens in which a plurality of metasurface regions 120 are arrayed, similarly to the metalens 111.

Second Exemplary Embodiment

Next, a second exemplary embodiment of the present disclosure will be described below by using FIG. 9 and FIG. 10.

Figure 9:
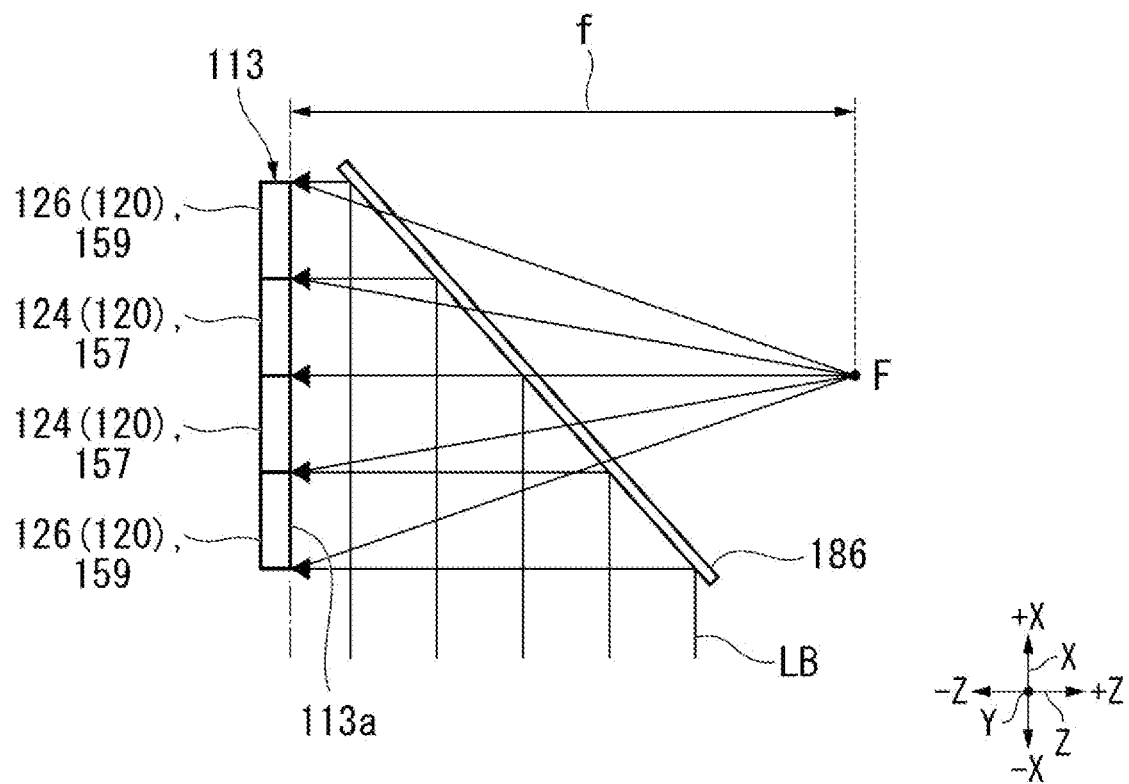
FIG. 9 is a side view of a wavefront control element according to a second exemplary embodiment.

FIG. 9 is a side view of a metalens (wavefront control element) 113 according to the second exemplary embodiment. In a wavefront control element according to each of the second exemplary embodiment and the exemplary embodiments subsequent to the second exemplary embodiment, which will be described below, a configuration common to that of the wavefront control element according to the upper exemplary embodiment is denoted by the same reference sign as that of the common configuration, and a description thereof is omitted. In principle, for the wavefront control element according to each of the second exemplary embodiment and the exemplary embodiments subsequent to the second exemplary embodiment, only points being different from the wavefront control according to the upper exemplary embodiment will be described.

As illustrated in FIG. 9, the metalens 113 has a configuration similar to that of the metalens 111, except that the metasurface regions 121 to 123 of the transmission type are respectively replaced with metalenses 157 to 159 that respectively constitute metasurface regions 124 to 126 of reflection type. Note that in FIG. 9, the metasurface region 125 and the metalens 158 do not appear. A half mirror 186 is disposed at the front side of the metalens 113 in a traveling direction of the light beam bundle LB incident on the metalens 113. In the second exemplary embodiment, the light beam bundle LB emitted from the light source device 2 of the projector 1 is incident on the half mirror 186, and is reflected toward a surface 113*a* at the +Z side of the metalens 113. The light beam bundle LB incident on the metalens 113 from the surface 113*a*, that is, from the +Z side, is reflected by the plurality of metasurface regions 124 to 126, passes through the half mirror 186, and converges to the focal point F at the +Z side (the same side) as the incident side in the Z direction.

Figure 10:
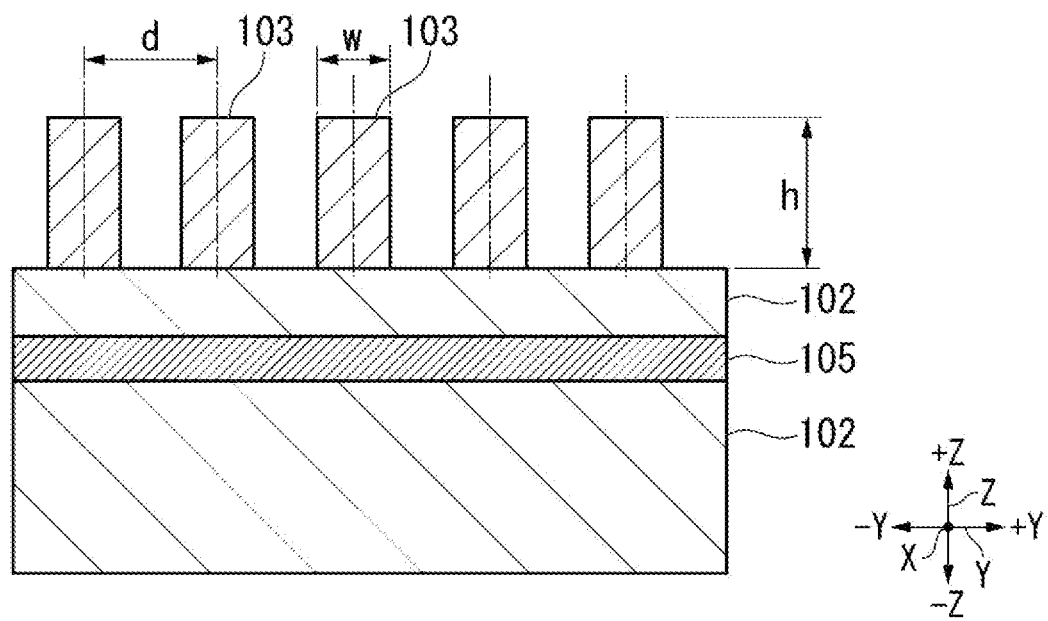
FIG. 10 is a cross-sectional view of a metasurface region of the wavefront control element illustrated in FIG. 9.

FIG. 10 is a cross-sectional view of the metasurface region 120 of the metalens 113 cut parallel to the XY plane. In the metasurface region 120 of the metalens 113, a reflection layer 105 made of metal such as aluminum (Al) is provided inside the base material 102 in the Z direction. The shape of the structure 103 of the metasurface region (first metasurface region) 124 and the distribution of the plurality of structures 103 are designed similarly to the shape of the structure 103 of the metasurface region 121 and the distribution of the plurality of structures 103. The shape of the structure 103 of each of the metasurface regions (second metasurface regions) 125 and 126 and the distribution of the plurality of structures 103 are designed similarly to the shape of the structure 103 of each of the metasurface regions 122 and 123 and the distribution of the plurality of structures 103. However, since each of the surface regions 124 to 126 is a reflection type, the height h of the structure 103 of each of the metasurface regions 124 to 126 is about (½) the height h of the structure 103 of each of the metasurface regions 121 to 123 of the transmission type.

The metalens 113 according to the second exemplary embodiment described above exhibits working effects similar to those of the metalens 111 according to the first exemplary embodiment with regard to the configuration common to that of the metalens 111 according to the first exemplary embodiment. Further, the lighting device 100 provided with the metalens 113 according to the second exemplary embodiment and the projector 1 provided with the lighting device 100 exhibit working effects similar to those of the lighting device 100 and the projector 1 described in the first exemplary embodiment.

In the metalens 113 according to the second exemplary embodiment, each of the plurality of the metasurface regions 120 is a metasurface of reflection type. With the metalens 113 according to the second exemplary embodiment, it is possible to implement a converging lens of reflection type in which the calculation load and the calculation time of the electromagnetic wave analysis are decreased to about a practical level. In addition, with the metalens 113 according to the second exemplary embodiment, a part of the light beam bundle LB incident on the metalens 113 and a part of the light beam bundle LB emitted from the metalens 113 share an optical path in the Z direction, and thus, the sizes of the lighting device 100 and the projector 1 in which the metalens 113 is mounted can be reduced, compared to the lighting device 100 and the projector 1 according to the first exemplary embodiment.

Note that in the projector 1 described with reference to FIG. 1, the reflection mirror 250 corresponding to the blue light B and the relay lens 270 may be integrated. Also, the dichroic mirror 220 corresponding to the green light G and the relay lens 260 may be integrated. In the projector 1 according to the second exemplary embodiment, these mirrors and relay lenses integrated with each other may be constituted by a metalens or a wavefront control element in which a plurality of the metasurface regions 120 are arrayed, similarly to the metalens 113. This makes it possible to further reduce the sizes of the lighting device 100 and the projector 1 in which the metalens 113 is mounted.

Third Exemplary Embodiment

Next, a third exemplary embodiment according to the present disclosure will be described below by using FIG. 11.

Figure 11:
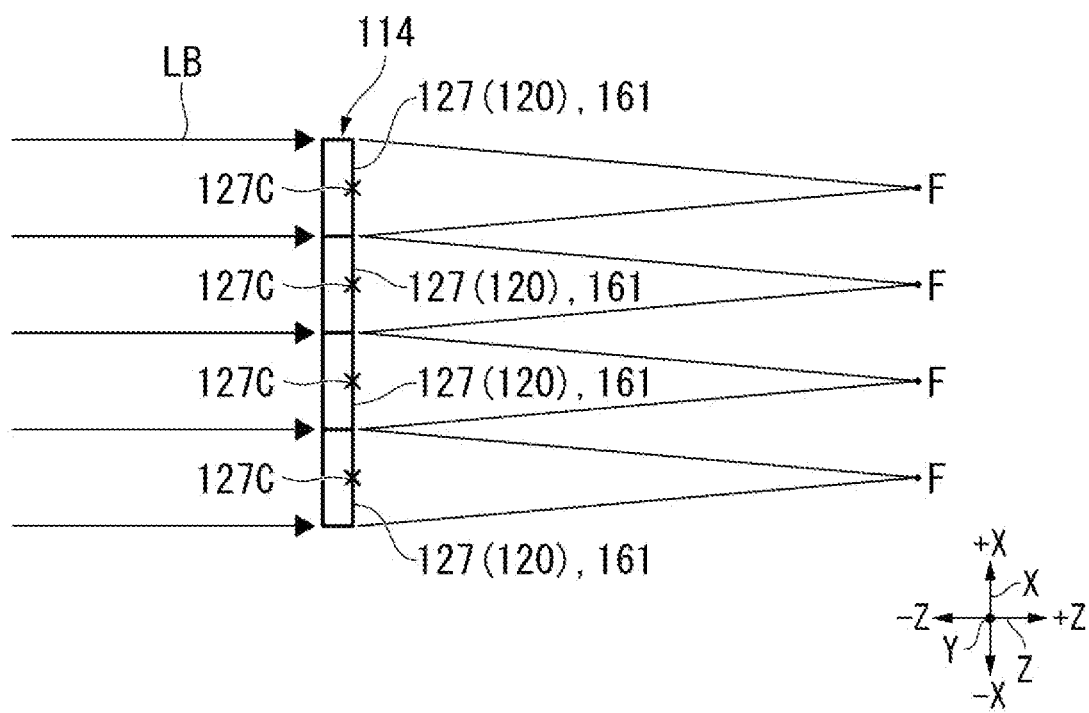
FIG. 11 is a side view of a wavefront control element according to a third exemplary embodiment.

FIG. 11 is a side view of a metalens (wavefront control element) 114 according to the third exemplary embodiment. As illustrated in FIG. 11, the metalens 114 includes a configuration similar to that of the metalens 111, except that each of the metasurface regions 121 to 123 is replaced with a metalens 161 of transmission type that constitutes a metasurface region 127 of transmission type. Also, the metalens 114 is applied to at least one of the first lens array 70 and the second lens array 80, instead of the converging optical system 30 of the projector 1 illustrated in FIG. 1. The metalenses 161 of the plurality of metasurface regions 120 of the metalens 114, that is, the metasurface regions 127 correspond to at least one type of small lenses of the plurality of small lenses 71 of the first lens array 70 and the plurality of small lenses 81 of the second lens array 80.

The center 127C and the focal point F in the X direction and the Y direction of the metalens 161 overlap each other in the X direction and the Y direction, and are separated by the focal distance f in the Z direction. The widths t and w of each of the plurality of structures 103 (not illustrated) of the metasurface region 127, the interval d between the structures 103 adjacent to each other in the XY plane, and an extending direction of the structure 103 are designed according to the dimension S120, the focal distance f, and the center wavelength (wavelength, peak wavelength) of the light beam bundle LB such that the light beam bundle LB incident on the metasurface region 127 converges to the focal point F at the +Z side separated by each dimension in the X direction, the Y direction, and the Z direction as described above. The height h of the plurality of structures 103 of the metasurface region 127 is set according to the center wavelength of the light beam bundle LB and a phase modulation amount required for the metalens 161.

For the metalens 114, the focal positions PF of the plurality of the metasurface regions 120 are different from each other in the XY plane. Specifically, for the metalens 114, the same number of focal points (a plurality of points) F as that of the metasurface regions 120, 127 are present. Additionally, for the metalens 114, the relative positions of the focal points F corresponding to the plurality of the metasurface regions 127 are the same as each other among the plurality of metasurface regions 127. Thus, the shapes and distributions of the plurality of metasurface regions 120 of the plurality of metalenses 114 are designed by calculating the respective shape and distribution of only one type of metasurface regions 127.

The metalens 114 according to the third exemplary embodiment described above exhibits working effects similar to those of the metalens 111 according to the first exemplary embodiment with regard to the configuration common to the metalens 111 according to the first exemplary embodiment. Also, the lighting device 100 including the metalens 114 according to the third exemplary embodiment and the projector 1 including the lighting device 100 exhibit working effects to those of the lighting device 100 and the projector 1 described in the first exemplary embodiment.

For the metalens 114 according to the third exemplary embodiment, each of the plurality of metasurface regions 120 includes the metasurface region 127. The focal positions of the plurality of metasurface regions 127 are different from each other in the XY plane. Specifically, the plurality of metasurface regions 127 converge the light beam bundle LB to the respective focal points F. In other words, the metalens 114 converges the light beam bundle LB at the opposite side to the incident side, that is, at the +Z side, in the Z direction along the optical axis AX of the incident light beam bundle LB to the plurality of focal points F of the same number as that of the plurality of metasurface regions 120. With the metalens 114 according to the third exemplary embodiment, it is possible to implement an on-axis type converging lens of a cm order in which the calculation load and the calculation time of the electromagnetic wave analysis are reduced to about a practical level. In addition, with the metalens 114 according to the third exemplary embodiment, a lens array having an ultra-thinner shape than those of typical types by using the metasurface regions 120 including the structures 13 of a nm order can be configured.

Note that although not illustrated, as a modified example of the metalens 114 according to the third exemplary embodiment, the plurality of metasurface regions 120 of the metalens 114 may include a first metasurface region and a second metasurface region, similarly to the metalens 111 according to the first exemplary embodiment. In that case, the focal position of the first metasurface region and the focal position of the second metasurface region may be different from each other.

Fourth Exemplary Embodiment

Next, a fourth exemplary embodiment according to the present disclosure will be described with reference to FIG. 12.

Figure 12:
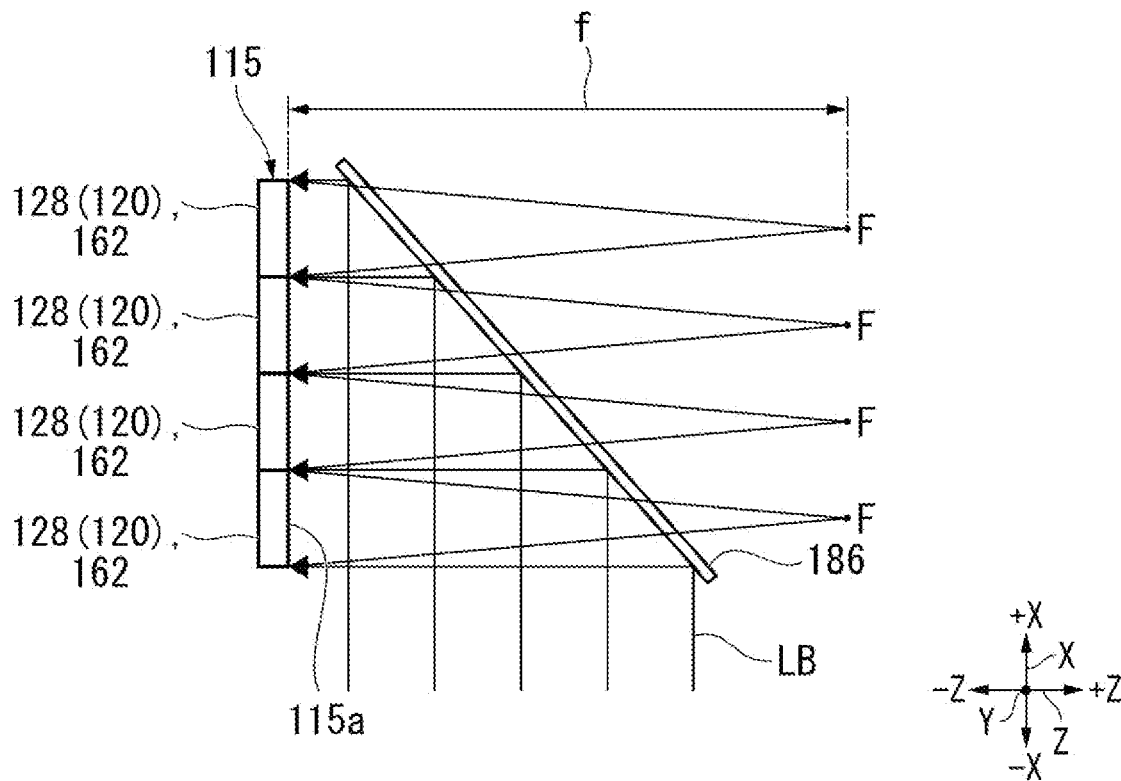
FIG. 12 is a side view of a wavefront control element according to a fourth exemplary embodiment.

FIG. 12 is a side view of a metalens (wavefront control element) 115 according to the fourth exemplary embodiment. As illustrated in FIG. 12, the metalens 115 has a configuration similar to that of the metalens 114, except that the metasurface region 127 of the transmission type is replaced with a metalens 162 of reflection type that constitutes a metasurface region 128 of reflection type. Also, in the projector 1 described with reference to FIG. 1, the reflection mirror 250 corresponding to the blue light B and the relay lens 270 may be integrated. Also, the dichroic mirror 220 corresponding to the green light G and the relay lens 260 may be integrated. The metalens 115 is applied to the mirror and relay lens that are integrated with each other in the projector 1 as described above.

The half mirror 186 is disposed at the front side of the metalens 115 in a traveling direction of the light beam bundle LB incident on the metalens 115. In the fourth exemplary embodiment, the light beam bundle LB emitted from the light source device 2 of the projector 1 is incident on the half mirror 186, and is reflected toward a surface 115a at the +Z side of the metalens 115. The light beam bundle LB incident on the metalens 115 from the surface 115*a*, that is, from the +Z side is reflected by the plurality of metasurface regions 128, passes through the half mirror 186, and converges to the focal point F at the +Z side (the same side) as the incident side in the Z direction.

Although not illustrated, the reflection layer 105 made of metal such as Al is provided inside the base material 102 in the Z direction in the metasurface region 120 of the metalens 115. The shape of the structure 103 of the metasurface region 128 and the distribution of the plurality of structures 103 are designed similarly to the shape of the structure 103 of the metasurface region 127 and the distribution of the plurality of structures 103. However, since the metasurface region 128 is a reflection type, the height h of the structure 103 of the metasurface region 128 is about (½) the height h of the structure 103 of the metasurface region 127 of the transmission type.

The metalens 115 according to the fourth exemplary embodiment described above exhibits working effects similar to the metalens 114 according to the third exemplary embodiment with regard to the configuration common to the metalens 114 according to the third exemplary embodiment. Also, the lighting device 100 including the metalens 115 according to the fourth exemplary embodiment and the projector 1 including the lighting device 100 exhibit working effects similar to the lighting device 100 and the projector 1 described in the first exemplary embodiment.

In the metalens 115 according to the fourth exemplary embodiment, each of the plurality of the metasurface regions 120 is a metasurface of reflection type. With the metalens 115 according to the fourth exemplary embodiment, a lens array of reflection type in which the calculation load and the calculation time of the electromagnetic wave analysis are reduced to about a practical level can be implemented. In addition, with the metalens 115 according to the fourth exemplary embodiment, a part of the light beam bundle LB incident on the metalens 115 and a part of the light beam bundle LB emitted from the metalens 115 share an optical path in the Z direction, and thus, the sizes of the lighting device 100 and the projector 1 in which the metalens 115 is mounted can be reduced, compared to the lighting device 100 and the projector 1 according to the third exemplary embodiment.

Fifth Exemplary Embodiment

Next, a fifth exemplary embodiment according to the present disclosure will be described with reference to FIG. 13.

Figure 13:
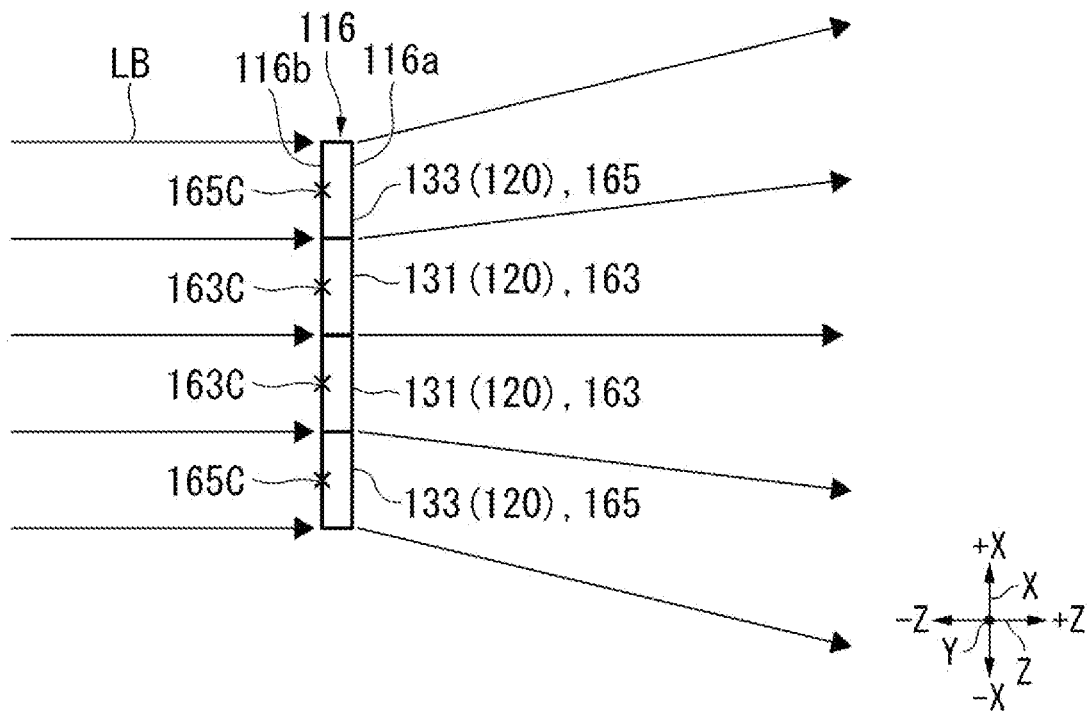
FIG. 13 is a side view of a wavefront control element according to a fifth exemplary embodiment.

FIG. 13 is a side view of a metalens (wavefront control element) 116 according to the fifth exemplary embodiment. As illustrated in FIG. 13, the metalens 116 has a configuration similar to that of the metalens 111, except that the metasurface regions 121 to 123 are respectively replaced with metalenses 163 to 165 of transmission type that constitute metasurface regions 131 to 133 of transmission type. Note that in FIG. 13, the metasurface region 132 and the metalens 164 do not appear. The metalens 116 is applied as a diffusion element (not illustrated) disposed in the projector 1 illustrated in FIG. 1 in order to appropriately diffuse the light beam bundle LB constituted by blue light.

Each of the metalenses 163 to 165 has a negative focal distance (not illustrated) and a diverging function. The respective focal points (not illustrated) of the metalenses 163 to 165 are identical to each other, and are present at the −Z side than being less than a back surface 116*b* positioned at a side at which the light beam bundle LB is incident on the metalens 116. A center 163C in the X direction and the Y direction of the metalens 163 and the focal point F (not illustrated) are separated by the dimension S120×(½) in each of the X direction and the Y direction, and are separated by a focal distance −f in the Z direction. A center 164C in the X direction and the Y direction of the metalens 164 and the focal point F are separated by the dimension S120×(3/2) in the X direction, are separated by the dimension S120×(½) in the Y direction, and are separated by the focal distance −f in the Z direction. A center 165C in the X direction and the Y direction of the metalens 165 and the focal point F are separated by the dimension S120×(3/2) in each of the X direction and the Y direction, and are separated by the focal distance −f in the Z direction. The respective widths t and w of the plurality of structures 103 (not illustrated) of each of the metasurface regions 131 to 133, the interval d between the structures 103 adjacent to each other in the XY plane, and an extending direction of the structure 103 are designed according to the dimension S120, the focal distance f, and the center wavelength (wavelength, peak wavelength) of the light beam bundle LB such that the light beam bundle LB incident on each of the metasurface regions 131 to 133 are caused to diverge to the +Z side on the assumption of the focal point F at the −Z side separated by the respective dimensions in the X direction, the Y direction, and the Z direction, as described above.

The metalens 116 according to the fifth exemplary embodiment described above exhibits working effects similar to those of the metalens 111 according to the first exemplary embodiment with regard to the configuration common to the metalens 111 according to the first exemplary embodiment. Also, the lighting device 100 including the metalens 116 according to the fifth exemplary embodiment and the projector 1 including the lighting device 100 exhibit working effects similar to those of the lighting device 100 and the projector 1 described in the first exemplary embodiment.

For the metalens 116 according to the fifth exemplary embodiment, the focal position of the metasurface region (first metasurface region) 131 and the focal position of each of the metasurface regions (second metasurface regions) 132 and 133 are identical to each other, but are present at the −Z side being less than the metalens 116. Thus, the metasurface regions 131 to 133 cause the incident light beam bundle LB to diverge to the +Z side on the assumption of the identical and common focal point F to each other. In other words, the metalens 116 causes the light beam bundle LB to diverge in the Z direction along the optical axis AX of the incident light beam bundle LB at the opposite side to the incident side, that is, the +Z side. With the metalens 116 according to the fifth exemplary embodiment, it is possible to implement an off-axis type diverging lens of a cm order in which the calculation load and the calculation time of the electromagnetic wave analysis are reduced to about a practical level.

Sixth Exemplary Embodiment

Next, a sixth exemplary embodiment according to the present disclosure will be described with reference to FIG. 14.

Figure 14:
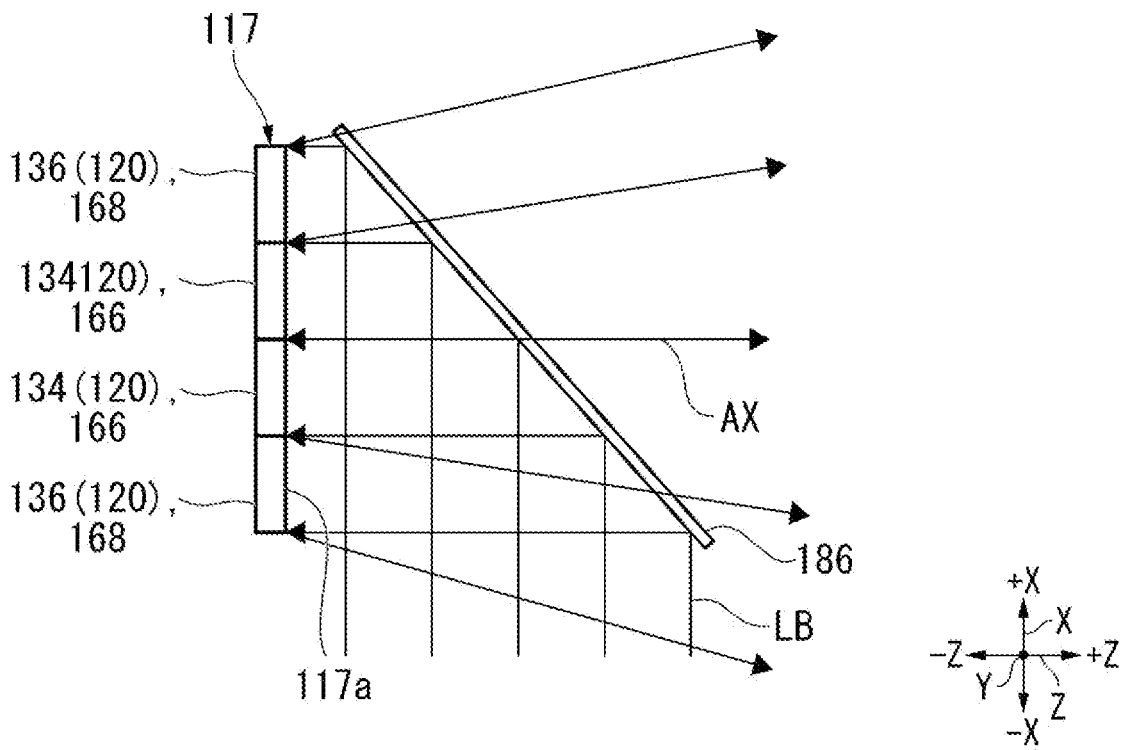
FIG. 14 is a side view of a wavefront control element according to a sixth exemplary embodiment.

FIG. 14 is a side view of a metalens (wavefront control element) 117 according to the sixth exemplary embodiment. As illustrated in FIG. 14, the metalens 117 has a configuration similar to that of the metalens 116, except that the metasurface regions 131 to 133 of transmission type are respectively replaced with metalenses 166 to 168 of reflection type that constitute metasurface regions 134 to 136 of reflection type. Note that in FIG. 14, the metasurface region 135 and the metalens 167 do not appear. The metalens 117 is applied as a diffusion element (not illustrated) disposed in the projector 1 illustrated in FIG. 1 in order to appropriately diffuse the light beam bundle LB constituted by blue light.

The half mirror 186 is disposed at the front side of the metalenses 166 to 168 in a traveling direction of the light beam bundle LB incident on each of the metalenses 166 to 168. In the sixth exemplary embodiment, the light beam bundle LB constituted by blue light to be diffused in the projector 1 is incident on the half mirror 186, and is reflected toward a surface 117a at the +Z side of the metalens 117. The light beam bundle LB incident on the metalens 117 from the surface 117a, that is, from the +Z side, is emitted to the +Z side by each of the plurality of the metasurface regions 134 to 136, passes through the half mirror 186, and diverges to the +Z side (the same side) as the incident side in the Z direction. As a result, the light beam bundle LB emitted from the metalens 117 to the +Z side is diffused with respect to at least the optical axis AX.

Although not illustrated, the reflection layer 105 made of metal such as Al is provided inside the base material 102 in the Z direction in the metasurface region 120 of the metalens 117. The shape of the structure 103 of each of the metasurface regions 134 to 136 and the distribution of the plurality of structures 103 are designed similarly to the shape of the structure 103 of each of the metasurface regions 131 to 133 and the distribution of the plurality of structures 103. However, since each of the metasurface regions 134 to 136 is a reflection type, the height h of the structure 103 of each of the metasurface regions 134 to 136 is about (½) the height h of the structure 103 of each of the metasurface regions 131 to 133 of transmission type.

The metalens 117 according to the sixth exemplary embodiment described above exhibits working effects similar to those of the metalens 116 according to the fifth exemplary embodiment with regard to the configuration common to the metalens 116 according to the fifth exemplary embodiment. Also, the lighting device 100 including the metalens 117 according to the sixth exemplary embodiment and the projector 1 including the lighting device 100 exhibit working effects similar to those of the lighting device 100 and the projector 1 described in the first exemplary embodiment.

In the metalens 117 according to the sixth exemplary embodiment, each of the plurality of the metasurface regions 120 is a metasurface of reflection type. With the metalens 117 according to the sixth exemplary embodiment, it is possible to implement a diverging lens of reflection type in which the calculation load and the calculation time of the electromagnetic wave analysis are reduced to about a practical level. In addition, with the metalens 117 according to the sixth exemplary embodiment, a part of the light beam bundle LB incident on the metalens 117 and a part of the light beam bundle LB emitted from the metalens 117 share an optical path in the Z direction, and thus, the sizes of the lighting device 100 and the projector 1 in which the metalens 117 is mounted can be reduced as compared with the lighting device 100 and the projector 1 according to the fifth exemplary embodiment.

Seventh Exemplary Embodiment

Next, a fifth exemplary embodiment according to the present disclosure will be described with reference to FIG. 15.

Figure 15:
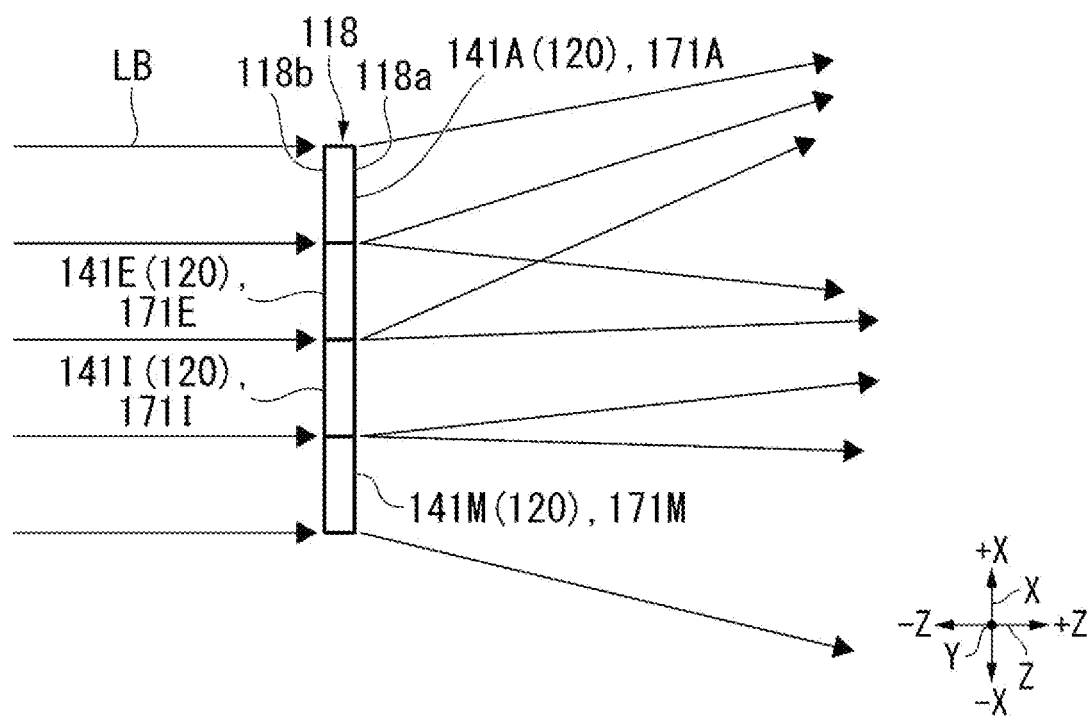
FIG. 15 is a side view of a wavefront control element according to a seventh exemplary embodiment.

FIG. 15 is a side view of a metalens (wavefront control element) 118 according to the seventh exemplary embodiment. The metalens 118 includes 16 metasurface regions 120 in the XY plane, as can be seen with reference to FIG. 3. In the metalens 118, the 16 metasurface regions 120 are constituted by 16 types of metasurface regions 141A to 141P. The 16 types of metasurface regions 141A to 141P are constituted by 16 types of metalenses 171A to 171P. The focal points F (not illustrated) of the 16 types of metasurface regions 141A to 141P and the metalenses 171A to 171P are different from each other both in the Z direction and in the XY plane, and are randomly arranged. The metalens 118 is applied as a diffusion element (not illustrated) disposed in the projector 1 illustrated in FIG. 1 in order to appropriately diffuse the light beam bundle LB constituted by blue light.

In FIG. 15, the metasurface regions 141A, 141E, 141I, and 141M are exemplified as the four metasurface regions 120 positioned at −Y side being the least among the 16 types of metasurface regions 141A to 141P. A focal point F (not illustrated) of the metasurface region 141A is present at least at the +X side in the X direction and the +Z side in the Z direction than the metasurface region 141A. Two focal points F (not illustrated) of the metasurface region 141E are present in the X direction, and are present at least at the +X side in the X direction and the +Z side in the Z direction than the metasurface region 141E. A focal point F (not illustrated) of the metasurface region 141I is present at least at the +X side in the X direction and the +Z side in the Z direction than the metasurface region 141I. A focal point F (not illustrated) of the metasurface region 141M is present at least at the +X side in the X direction than the metasurface region 141M and the −Z side in the Z direction than the metasurface region 141M. The metalens 118, as a whole, causes the light beam bundle LB to diffuse (divergence) at the opposite side to the incident side, that is, at the +Z side, in the Z direction along the optical axis AX of the incident light beam bundle LB.

The respective widths t and w of the plurality of structures 103 (not illustrated) of each of the metasurface regions 141A to 141P, the interval d between the structures 103 adjacent to each other in the XY plane, and an extending direction of the structure 103 are designed according to the dimension S120, the focal distance f or the focal distance −f, and the center wavelength (wavelength, peak wavelength) of the light beam bundle LB such that the light beam bundle LB incident on each of the metasurface regions 141A to 141P converges to the focal point F at the +Z side separated by each of dimensions in the X direction, the Y direction, and the Z direction, or diverges to the +Z side.

The metalens 118 according to the seventh exemplary embodiment described above exhibits working effects similar to those of the metalens 116 according to the fifth exemplary embodiment with regard to the configuration common to the metalens 116 according to the fifth exemplary embodiment. Also, the lighting device 100 including the metalens 118 according to the seventh exemplary embodiment and the projector 1 including the lighting device 100 exhibit working effects similar to those of the lighting device 100 and the projector 1 described in the first exemplary embodiment.

With the metalens 118 according to the seventh exemplary embodiment, the focal points F (not illustrated) of the 16 types of the metasurface regions 141A to 141P and the metalenses 171A to 171P are randomly arranged both in the XY plane and in the Z direction. With the metalens 118 according to the seventh exemplary embodiment, a diffusion degree with respect to the incident light beam bundle LB can be increased compared to the metalens 116 according to the fifth exemplary embodiment.

Eighth Exemplary Embodiment

Next, an eighth exemplary embodiment according to the present disclosure will be described with reference to FIG. 16.

Figure 16:
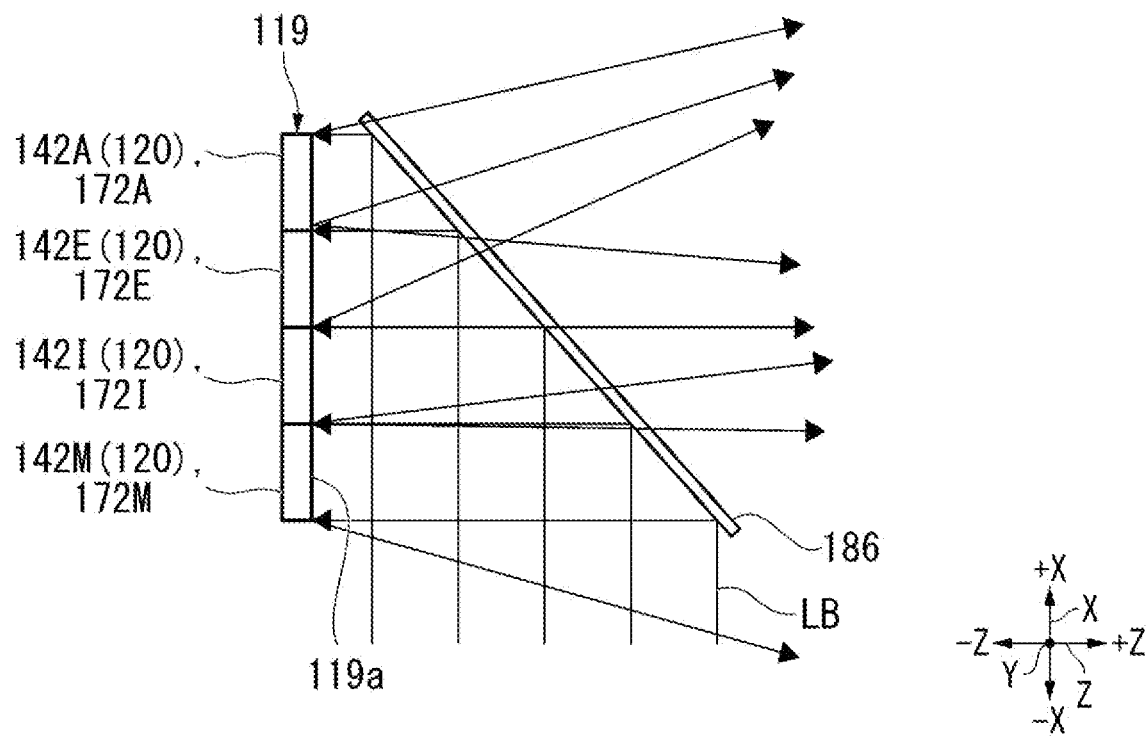
FIG. 16 is a side view of a wavefront control element according to an eighth exemplary embodiment.

FIG. 16 is a side view of a metalens (wavefront control element) 119 according to the eighth exemplary embodiment. As illustrated in FIG. 16, the metalens 119 has a configuration similar to that of the metalens 118, except that the metasurface regions 141A to 141P of the transmission type are respectively replaced with metalenses 172A to 172P of reflection type that constitute metasurface regions 142A to 142P of reflection type. Note that, in FIG. 16, only the metasurface regions 142A, 142E, 142I, and 142M, and the metalenses 172A, 172E, 172I, and 172M are exemplified among the metasurface regions 142A to 142P and the metalenses 172A to 172P. The metalens 119 is applied as a diffusion element (not illustrated) disposed in the projector 1 illustrated in FIG. 1 in order to appropriately diffuse the light beam bundle LB constituted by blue light.

The half mirror 186 is disposed at the front side of the metalenses 172A to 172P in a traveling direction of the light beam bundle LB incident on each of the metalenses 172A to 172P. In the eighth exemplary embodiment, the light beam bundle LB constituted by the blue light to be diffused in the projector 1 is incident on the half mirror 186, and is reflected toward a surface 119a at the +Z side of the metalens 119. The light beam bundle LB incident on the metalens 119 from the surface 119a, that is, from the +Z side, is emitted to the +Z side by each of the plurality of metasurface regions 142A to 142P, passes through the half mirror 186, and converges to the +Z side identical to the incident side in the Z direction, or diverges to the +Z side. As a result, the light beam bundle LB emitted from the metalens 118 to the +Z side (the same side as the incident side) is diffused (caused to diverge) with respect to at least the optical axis AX.

Although not illustrated, the reflection layer 105 made of metal such as Al is provided inside the base material 102 in the Z direction in the metasurface region 120 of the metalens 119. The shape of the structure 103 of each of the metasurface regions 142A to 142P and the distribution of the plurality of structures 103 are designed similarly to the shape of the structure 103 of each of the metasurface regions 141A to 141P and the distribution of the plurality of structures 103. However, since each of the metasurface regions 142A to 142P is a reflection type, the height h of the structure 103 of each of the metasurface regions 142A to 142P is approximately (½) the height h of the structure 103 of each of the metasurface regions 141A to 141P of the transmission type.

The metalens 119 according to the eighth exemplary embodiment described above exhibits working effects similar to those of the metalens 118 according to the seventh exemplary embodiment with regard to the configuration common to the metalens 118 according to the seventh exemplary embodiment. Also, the lighting device 100 including the metalens 119 according to the eighth exemplary embodiment and the projector 1 including the lighting device 100 exhibit working effects similar to those of the lighting device 100 and the projector 1 described in the first embodiment.

In the metalens 119 according to the eighth exemplary embodiment, each of the plurality of the metasurface regions 120 is a metasurface of reflection type. With the metalens 119 according to the eighth exemplary embodiment, it is possible to implement a diverging lens of reflection type in which the calculation load and the calculation time of the electromagnetic wave analysis are reduced to about a practical level and that has a high diffusion degree as compared to the metalens 117 according to the fifth exemplary embodiment. In addition, with the metalens 119 according to the eighth exemplary embodiment, a part of the light beam bundle LB incident on the metalens 119 and a part of the light beam bundle LB emitted from the metalens 119 share an optical path in the Z direction, and thus, the sizes of the lighting device 100 and the projector 1 in which the metalens 119 is mounted can be reduced as compared with the lighting device 100 and the projector 1 according to the seventh exemplary embodiment.

The preferred exemplary embodiments of the present disclosure have been described above in detail, but the present disclosure is not limited to a specific embodiment according to the present disclosure, and various modifications and changes can be implemented within the scope of the present disclosure described within the claims. Further, the constituent elements of a plurality of the exemplary embodiments can be combined as appropriate.

For example, as the plurality of metasurface regions 120 in the metalens (wavefront control element) according to each of the above-described exemplary embodiments, the metasurface regions 120 arranged in four rows x four columns as viewed along the Z direction so as to be matched in position with each other in each of the X direction and the Y direction are exemplified. However, as described above, the relative arrangement and the number of the plurality of the metasurface regions 120 are not particularly limited, and can be freely designed as appropriate, as long as the plurality of the metasurface regions 120 constitute a single metalens (wavefront control element) as a whole, and are arranged in an array, as described above. For example, the plurality of metasurface regions 120 may be alternately arranged in each of the X direction and the Y direction. In that case, the plurality of metasurface regions 120 are symmetrical with respect to the center in the XY plane of the metalens, as described in each of the above-described exemplary embodiments, so that the number of types of patterns of the plurality of structures 103 of the plurality of the metasurface regions 120 to be targeted for design evaluation can be suppressed, and the calculation load and the calculation time of the electromagnetic wave analysis in the design evaluation can be suppressed.

Additionally, in the metalens (wavefront control element) of each of the above-described exemplary embodiments, the shape of each of the plurality of metasurface regions 120 viewed from the Z direction is not limited to a rectangular shape, and may be any shape such as a circular shape or a parallelogram shape.

Additionally, in the metalens (wavefront control element) according to the present disclosure, each of the plurality of the metasurface regions does not need to have a converging function or a diverging function, and may deflect the light beam bundle (incident light) in a direction intersecting the incident direction on the metalens. In that case, a lens array of an ultra-thin type constituted by a plurality of metasurface regions including structures of a nm order can be configured as the whole metalens.

For example, the metalens according to each of the above-described exemplary embodiments may be used in a lighting device or a light source device of a scanner optical system (not illustrated). In this case, it is possible to implement a scanner device that includes a metalens and a metasurface optical element that are smaller and ultra-thinner than typical metalenses and metasurface optical elements, and in which the calculation load and the calculation time of the electromagnetic wave analysis in evaluating the design can be suppressed.

Also, the metalens of each of the above-described exemplary embodiments may be used in a projection optical system for sensing that operates in an infrared wavelength range. In this case, it is possible to implement an interactive projector that includes a metalens and a metasurface optical element that are smaller and ultra-thinner than typical metalenses and metasurface optical elements, in which the calculation load and the calculation time in evaluating the design can be suppressed. Furthermore, the metalens according to each of the above-described exemplary embodiments may be applied to a light source device or a projection device of a display device such as a head-mounted display (HD). This makes it possible to reduce the calculation load and the calculation time of the electromagnetic wave analysis in evaluating the design of the metalens to a practical level while reducing the size and thickness of the light source device or the projection device of the HMD.

A wavefront control element according to an aspect of the present disclosure may have the following configuration.

A wavefront control element according to one aspect of the present disclosure is a wavefront control element configured to control a wavefront of incident light, and including a plurality of metasurface regions. The plurality of metasurface regions are arranged in an array, and each of the plurality of metasurface regions has a lens function. Each of the plurality of metasurface regions converges or diverges the incident light.

In the wavefront control element according to one aspect of the present disclosure, the plurality of the metasurface regions may have a first metasurface region and a second metasurface region, and a focal position of the first metasurface region and a focal position of the second metasurface region may be identical to each other.

In the wavefront control element according to one aspect of the present disclosure, the plurality of the metasurface regions may have a first metasurface region and a second metasurface region, and a focal position of the first metasurface region and a focal position of the second metasurface region may be different from each other.

In the wavefront control element according to one aspect of the present disclosure, each of the plurality of the metasurface regions may be a metasurface of transmission type.

In the wavefront control element according to one aspect of the present disclosure, each of the plurality of the metasurface regions may be a metasurface of reflection type.

In the wavefront control element according to one aspect of the present disclosure, the plurality of the metasurface regions may be disposed symmetrical to each other with respect to a center.

In the wavefront control element according to one aspect of the present disclosure, the incident light may be caused to converge to one point at a side opposite to an incident side or at a side identical to the incident side in a direction along an optical axis of the incident light.

In the wavefront control element according to one aspect of the present disclosure, the incident light may be caused to converge to a plurality of points at a side opposite to an incident side or at a side identical to the incident side in a direction along an optical axis of the incident light, the number of the plurality of points being the same as the number of the plurality of metasurface regions.

In the wavefront control element according to one aspect of the present disclosure, the incident light may be cause to diverge at a side opposite to an incident side or at a side identical to the incident side in a direction along an optical axis of the incident light.

A lighting device according to an aspect of the present disclosure may have the following configuration.

A lighting device according to one aspect of the present disclosure includes the wavefront control element described above.

A projector according to an aspect of the present disclosure may have the following configuration.

A projector according to one aspect of the present disclosure includes the above-described lighting device, a light modulation device configured to modulate light from the lighting device according to image information to form imaging light, and a projection optical system configured to project the imaging light.

What is claimed is:

1. A wavefront control element configured to control a wavefront of incident light, the wavefront control element comprising:
    a plurality of metasurface regions, wherein
    the plurality of metasurface regions are arranged in an array, and each of the plurality of metasurface regions has a lens function,
    each of the plurality of metasurface regions converges or diverges the incident light, and
    the incident light converges to one point at a side opposite to an incident side or at a side identical to the incident side in a direction along an optical axis of the incident light.

2. The wavefront control element according to claim 1, wherein
    the plurality of metasurface regions includes a first metasurface region and a second metasurface region, and
    a focal position of the first metasurface region and a focal position of the second metasurface region are identical to each other.

3. The wavefront control element according to claim 1, wherein
    the plurality of metasurface regions includes a first metasurface region and a second metasurface region, and
    a focal position of the first metasurface region and a focal position of the second metasurface region are different from each other.

4. The wavefront control element according to claim 1, wherein
    each of the plurality of metasurface regions is a metasurface of transmission type.

5. The wavefront control element according to claim 1, wherein
    each of the plurality of metasurface regions is a metasurface of reflection type.

6. The wavefront control element according to claim 1, wherein
    the plurality of metasurface regions are disposed symmetrical to each other with respect to a center.

7. The wavefront control element according to claim 1, wherein
    the incident light converges to a plurality of points at a side opposite to an incident side or at a side identical to the incident side in a direction along an optical axis of the incident light, the number of the plurality of points being the same as the number of the plurality of metasurface regions.

8. The wavefront control element according to claim 1, wherein
the incident light diverges at a side opposite to an incident side or at a side identical to the incident side in a direction along an optical axis of the incident light.

9. A lighting device comprising:
the wavefront control element according to claim 1.

10. A projector comprising:
a lighting device according to claim 9;
a light modulation device configured to modulate light from the lighting device according to image information to form imaging light; and
a projection optical system configured to project the imaging light.

11. A wavefront control element configured to control a wavefront of incident light, the wavefront control element comprising:
a plurality of metasurface regions, wherein
the plurality of metasurface regions are arranged in an array, and each of the plurality of metasurface regions has a lens function,
each of the plurality of metasurface regions converges or diverges the incident light, and
the incident light converges to a plurality of points at a side opposite to an incident side or at a side identical to the incident side in a direction along an optical axis of the incident light, the number of the plurality of points being the same as the number of the plurality of metasurface regions.

12. A wavefront control element configured to control a wavefront of incident light, the wavefront control element comprising:
a plurality of metasurface regions, wherein
the plurality of metasurface regions are arranged in an array, and each of the plurality of metasurface regions has a lens function,
each of the plurality of metasurface regions converges or diverges the incident light, and
the incident light diverges at a side opposite to an incident side or at a side identical to the incident side in a direction along an optical axis of the incident light.

* * * * *